(12) United States Patent
Fukui et al.

(10) Patent No.: US 7,806,798 B2
(45) Date of Patent: Oct. 5, 2010

(54) INTERNAL TRANSMISSION HUB ASSEMBLY

(75) Inventors: Seiji Fukui, Osaka (JP); Shinji Kawamura, Osaka (JP)

(73) Assignee: Shimano Inc., Osaka (JP)

( * ) Notice: Subject to any disclaimer, the term of this patent is extended or adjusted under 35 U.S.C. 154(b) by 768 days.

(21) Appl. No.: 11/770,086

(22) Filed: Jun. 28, 2007

(65) Prior Publication Data

US 2009/0005210 A1    Jan. 1, 2009

(51) Int. Cl.
*F16H 3/44* (2006.01)

(52) U.S. Cl. ...................................... 475/297

(58) Field of Classification Search ........................ None
See application file for complete search history.

(56) References Cited

U.S. PATENT DOCUMENTS

| | | | |
|---|---|---|---|
| 5,562,563 A * | 10/1996 | Shoge | 475/298 |
| 5,863,270 A * | 1/1999 | Chen et al. | 475/289 |
| 6,267,704 B1 | 7/2001 | Patterson et al. | |
| 6,533,700 B2 | 3/2003 | Shoge | |
| 6,607,465 B1 | 8/2003 | Shoge | |
| 6,641,500 B2 * | 11/2003 | Shoge | 475/276 |
| 7,148,582 B2 * | 12/2006 | Matsueda et al. | 290/1 C |
| 7,682,283 B2 * | 3/2010 | Okoochi et al. | 475/297 |
| 7,708,666 B2 * | 5/2010 | Hino | 475/297 |

FOREIGN PATENT DOCUMENTS

DE    19927698 A1    12/2000

* cited by examiner

*Primary Examiner*—Dirk Wright
(74) *Attorney, Agent, or Firm*—Global IP Counselors, LLP

(57) ABSTRACT

A multi-speed internal bicycle hub transmission assembly includes a hub axle, a driver, a hub shell, a power transmission mechanism and a shift control mechanism. The driver and the hub shell are rotatably supported to the hub axle. The power transmission mechanism is disposed between the driver and the hub shell for transmitting rotational power from the driver to the hub shell. The shift control mechanism includes a shift controller and a positioner. The shift controller is movable in rotational directions relative to the hub axle to a plurality of orientations. Each orientation of the shift controller corresponds to selection of a corresponding one of plurality of power transmission paths of the power transmission mechanism. The positioner is non-movable in the rotational direction relative to the hub axle and is biased into contact with the shift controller.

13 Claims, 32 Drawing Sheets

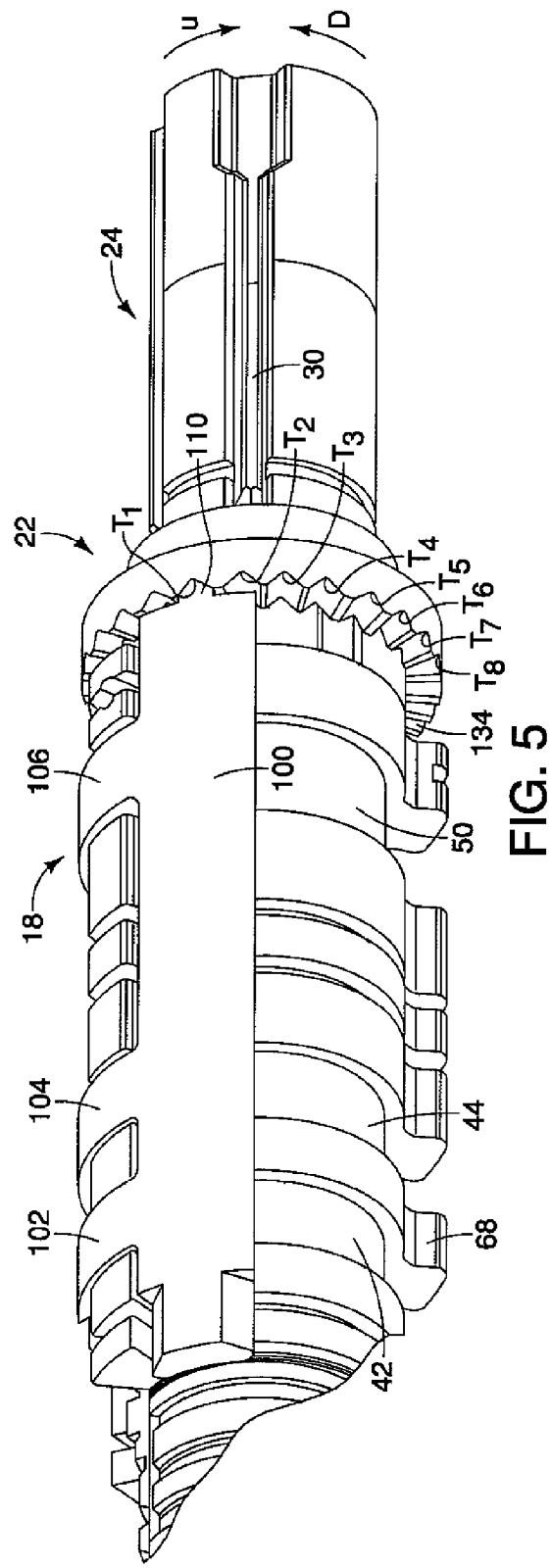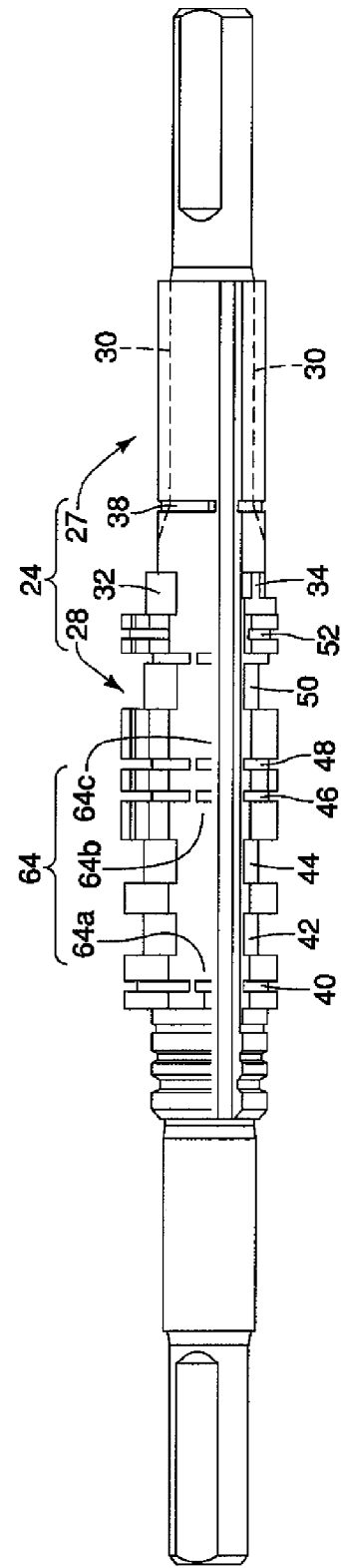
FIG. 5
FIG. 6

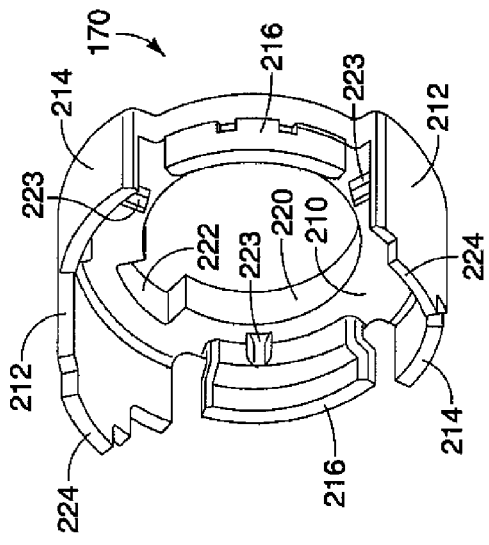
FIG. 11
FIG. 12
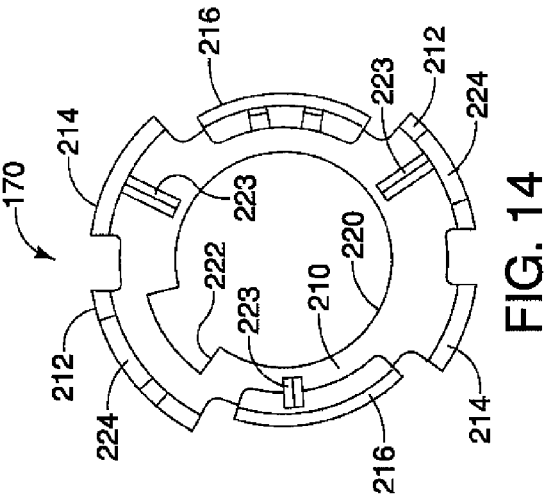
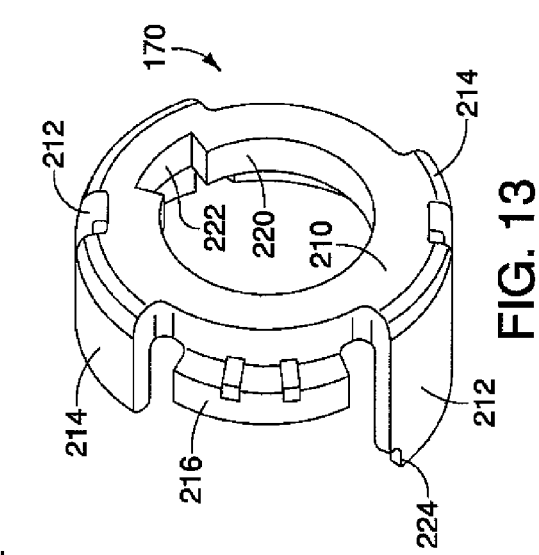
FIG. 13
FIG. 14

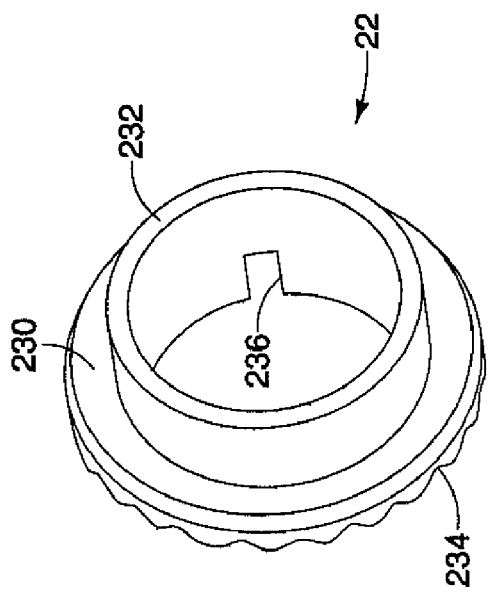
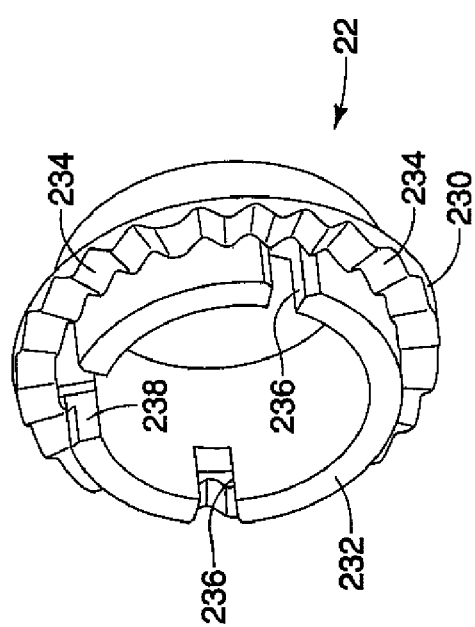
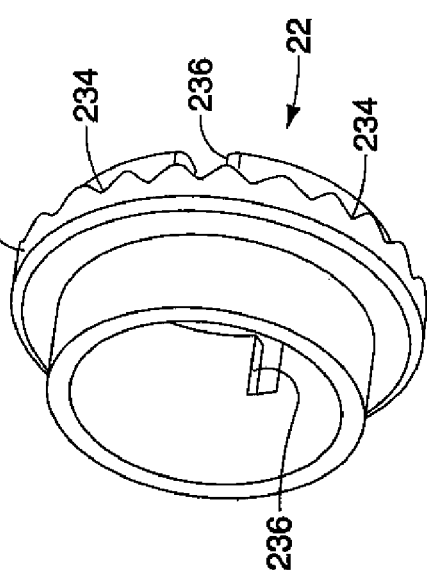
FIG. 16
FIG. 17
FIG. 15

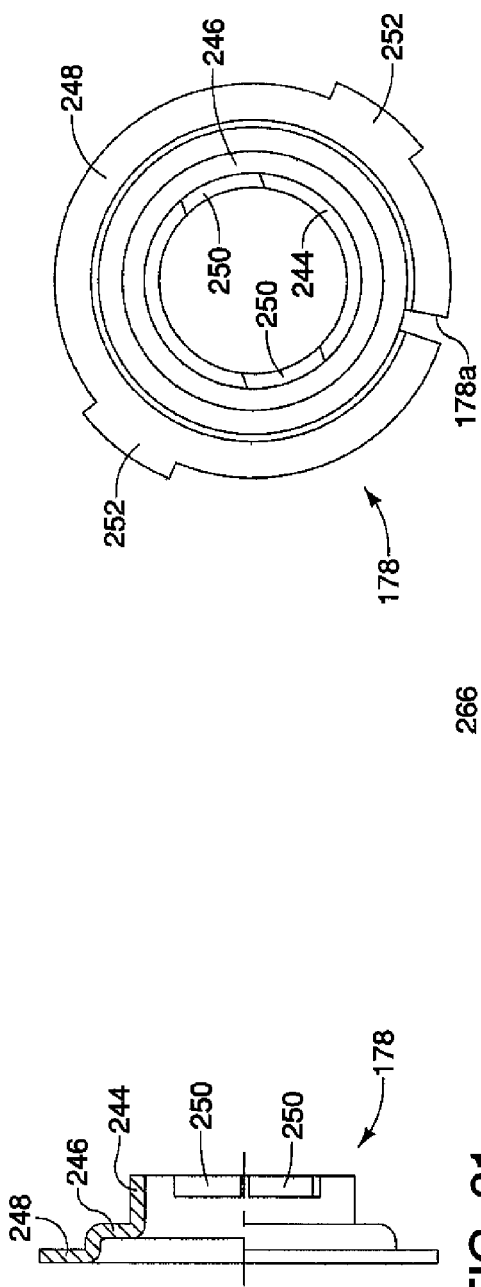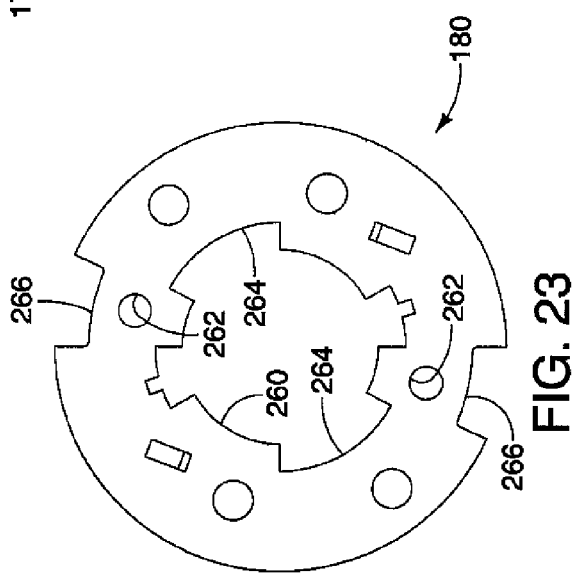

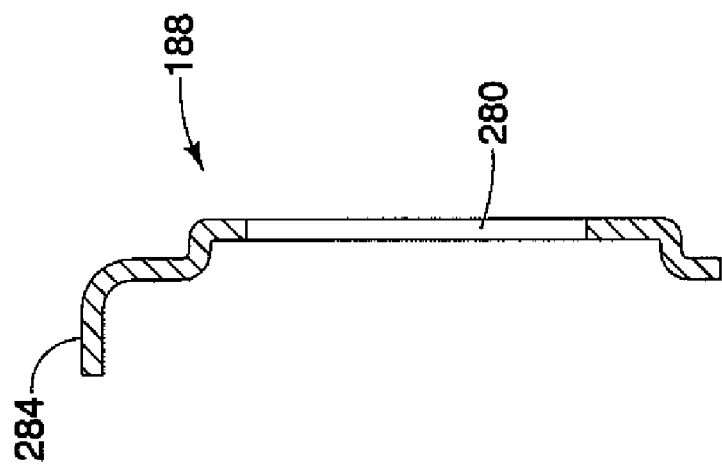
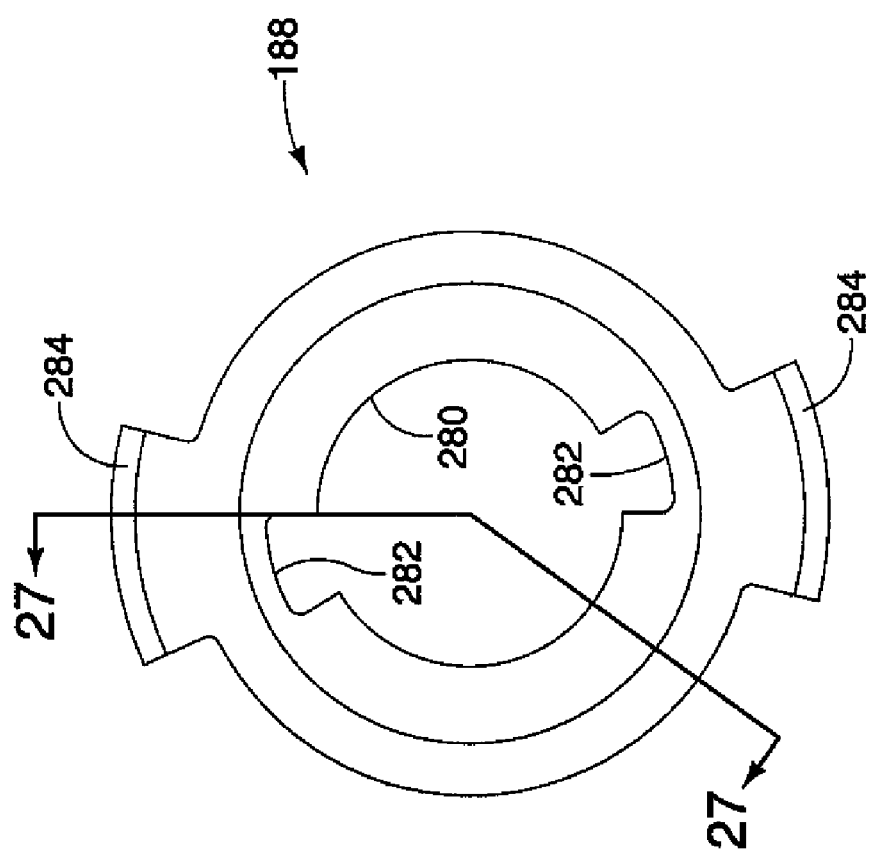

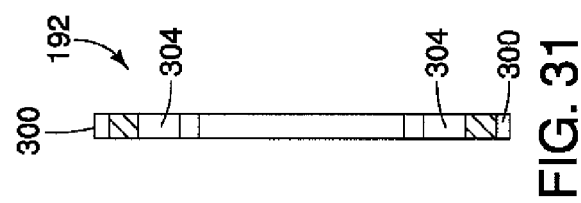
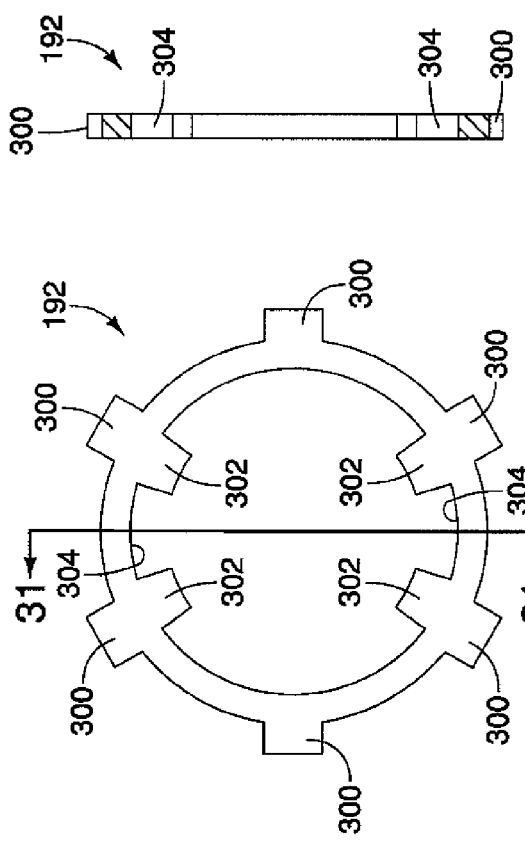
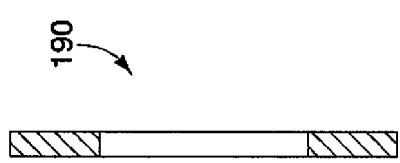
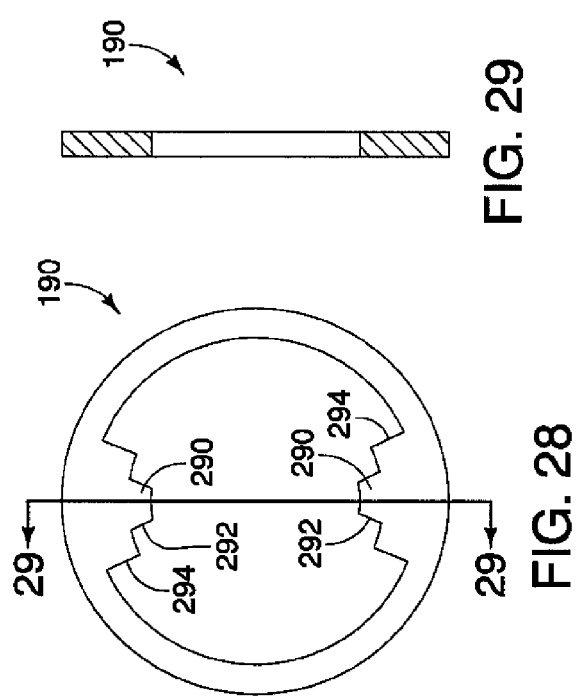

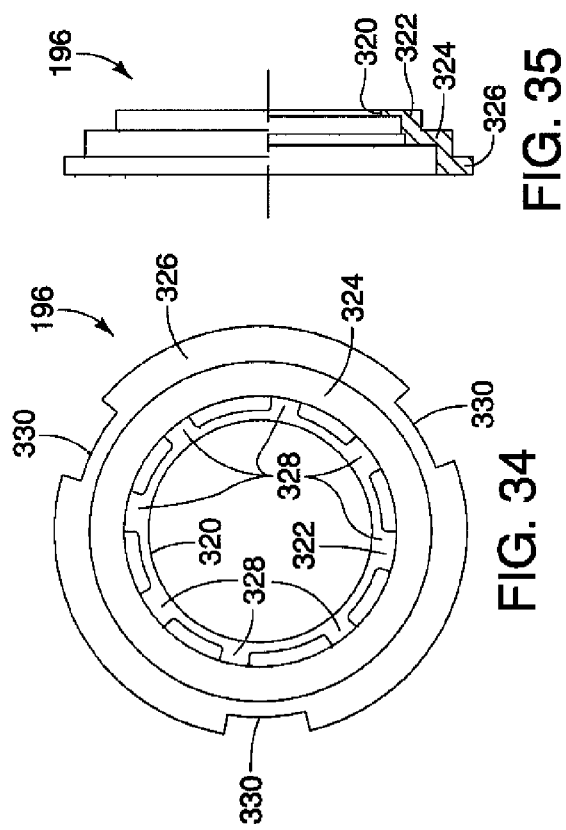

INTERNAL TRANSMISSION HUB ASSEMBLY

BACKGROUND OF THE INVENTION

1. Field of the Invention

This invention generally relates to an internal transmission hub assembly. More specifically, the present invention relates to an internal transmission hub assembly that includes an internal positioning member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle internal transmission hub assembly.

The internal transmission hub assembly is typically a rear wheel hub that includes an internal gearing mechanism that can be shifted to provide a plurality of power transmission paths (gear ratios) for a cyclist.

With such an internal transmission hub assembly, a cyclist changes pedaling speeds by manipulating a conventional lever actuating shifting mechanism installed on or adjacent to the handlebars of the bicycle. Movement of the lever actuating shifting mechanism is transmitted to the internal transmission hub assembly by a Bowden-type cable that is operably connected to a shift mechanism within the internal transmission hub assembly. Changes in the position of the lever actuating shifting mechanism cause corresponding changes in the selection of a power transmission path (gear ratio).

A problem with such an internal transmission hub assembly and conventional lever actuating shifting mechanism is that positioning of the elements within the internal transmission hub assembly is accomplished solely by the positioning of the lever actuating shifting mechanism and the cable. If the lever actuating shifting mechanism is not set to exactly the correct position or orientation, the appropriate elements within in the internal transmission hub assembly may not properly align. Such an improper alignment of elements within the internal transmission hub assembly requires minute movements of the conventional lever actuating shifting mechanism in order for the desired selection of power transmission paths.

In view of the above, it will be apparent to those skilled in the art from this disclosure that there exists a need for an improved internal transmission hub assembly that includes a more consistent means for establishing correct and complete shifting of the internal transmission hub assembly in the selection of the desired power transmission paths. This invention addresses this need in the art as well as other needs, which will become apparent to those skilled in the art from this disclosure.

SUMMARY OF THE INVENTION

One object of the present invention is to provide an internal transmission hub assembly with an internal positioning mechanism that ensures correct orientation of all elements that create a selected power transmission path.

Another object of the present invention is to provide an internal transmission hub assembly with reliable and accurate shifting between power transmission paths.

The foregoing objects can basically be attained by providing a multi-speed internal bicycle hub transmission assembly with a hub axle, a driver, a hub shell, a power transmission mechanism and a shift control mechanism. The driver is preferably rotatably supported to the hub axle. The hub shell is preferably rotatably supported to the hub axle. The power transmission mechanism is operably disposed between the driver and the hub shell for transmitting rotational power from the driver to the hub shell through a plurality of power transmission paths. The shift control mechanism includes a shift controller and a positioner. The shift controller is movable in rotational directions relative to the hub axle to a plurality of orientations. Each orientation of the shift controller corresponds to selection of a corresponding one of the plurality of power transmission paths of the power transmission mechanism. The positioner is non-movable in the rotational direction relative to the hub axle and is configured to urge the shift controller to remain at any selected one of the orientations.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is a perspective view of a portion of the hub assembly showing the hub axle, the pawl control member and the positioner with all other elements removed for clarity in accordance with the first embodiment of the present invention;

FIG. 6 is a side elevational view of the hub axle shown removed from the hub assembly in accordance with the first embodiment of the present invention;

FIG. 11 is a perspective view of the shifting key guide shown removed from the hub assembly in accordance with the first embodiment of the present invention;

FIG. 12 is another perspective view of the shifting key guide from a different angle shown removed from the hub assembly in accordance with the first embodiment of the present invention;

FIG. 13 is yet another perspective view of the shifting key guide from a reverse angle shown removed from the hub assembly in accordance with the first embodiment of the present invention;

FIG. 14 is an end plan view of the shifting key guide shown removed from the hub assembly in accordance with the first embodiment of the present invention;

FIG. 15 is a perspective view of the positioner shown removed from the hub assembly in accordance with the first embodiment of the present invention;

FIG. 16 is another perspective view of the positioner from a reverse angle shown removed from the hub assembly in accordance with the first embodiment of the present invention;

FIG. 17 is yet another perspective view of the positioner from a different angle shown removed from the hub assembly in accordance with the first embodiment of the present invention;

FIG. 21 is a part cross-sectional side view of the spring washer shown removed from the hub assembly in accordance with the first embodiment of the present invention;

FIG. 22 is an end elevational view of the spring washer shown removed from the hub assembly in accordance with the first embodiment of the present invention;

FIG. 23 is an end elevational view of the pawl support shown removed from the hub assembly in accordance with the first embodiment of the present invention;

FIG. 26 is an end elevational view of the pawl control washer shown removed from the hub assembly in accordance with the first embodiment of the present invention;

FIG. 27 is a cross-sectional side view of the pawl control washer taken along the line 27-27 in FIG. 26 in accordance with the first embodiment of the present invention;

FIG. 28 is an end elevational view of the holding plate shown removed from the hub assembly in accordance with the first embodiment of the present invention;

FIG. 29 is a cross-sectional side view of the holding plate taken along the line 29-29 in FIG. 28 in accordance with the first embodiment of the present invention;

FIG. 30 is an end elevational view of the actuator plate shown removed from the hub assembly in accordance with the first embodiment of the present invention;

FIG. 31 is a cross-sectional side view of the actuator plate taken along the line 31-31 in FIG. 30 in accordance with the first embodiment of the present invention;

FIG. 32 is an end elevational view of the spacer shown removed from the hub assembly in accordance with the first embodiment of the present invention;

FIG. 33 is a side view of the spacer shown removed from the hub assembly in accordance with the first embodiment of the present invention;

FIG. 34 is an end elevational view of the coupling plate shown removed from the hub assembly in accordance with the first embodiment of the present invention;

FIG. 35 is a part cross-sectional side view of the coupling plate shown removed from the hub assembly in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
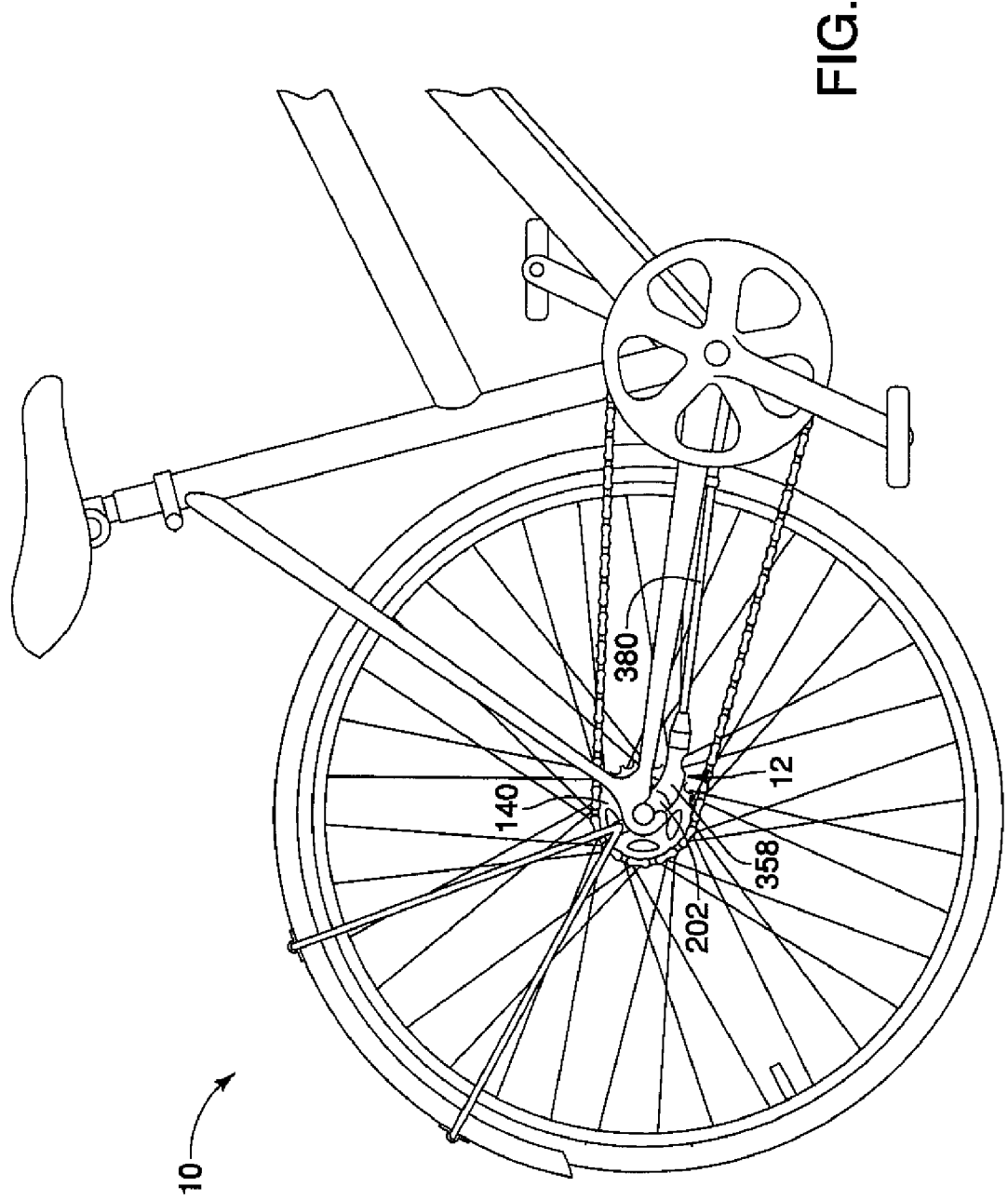
FIG. 1 is a fragmentary side elevation of a bicycle, showing a rear portion of the bicycle with a hub assembly in accordance with the present invention.

Referring initially to FIG. 1, a bicycle 10 with a hub assembly 12 is illustrated in accordance with a first embodiment of the present invention.

Figure 2:
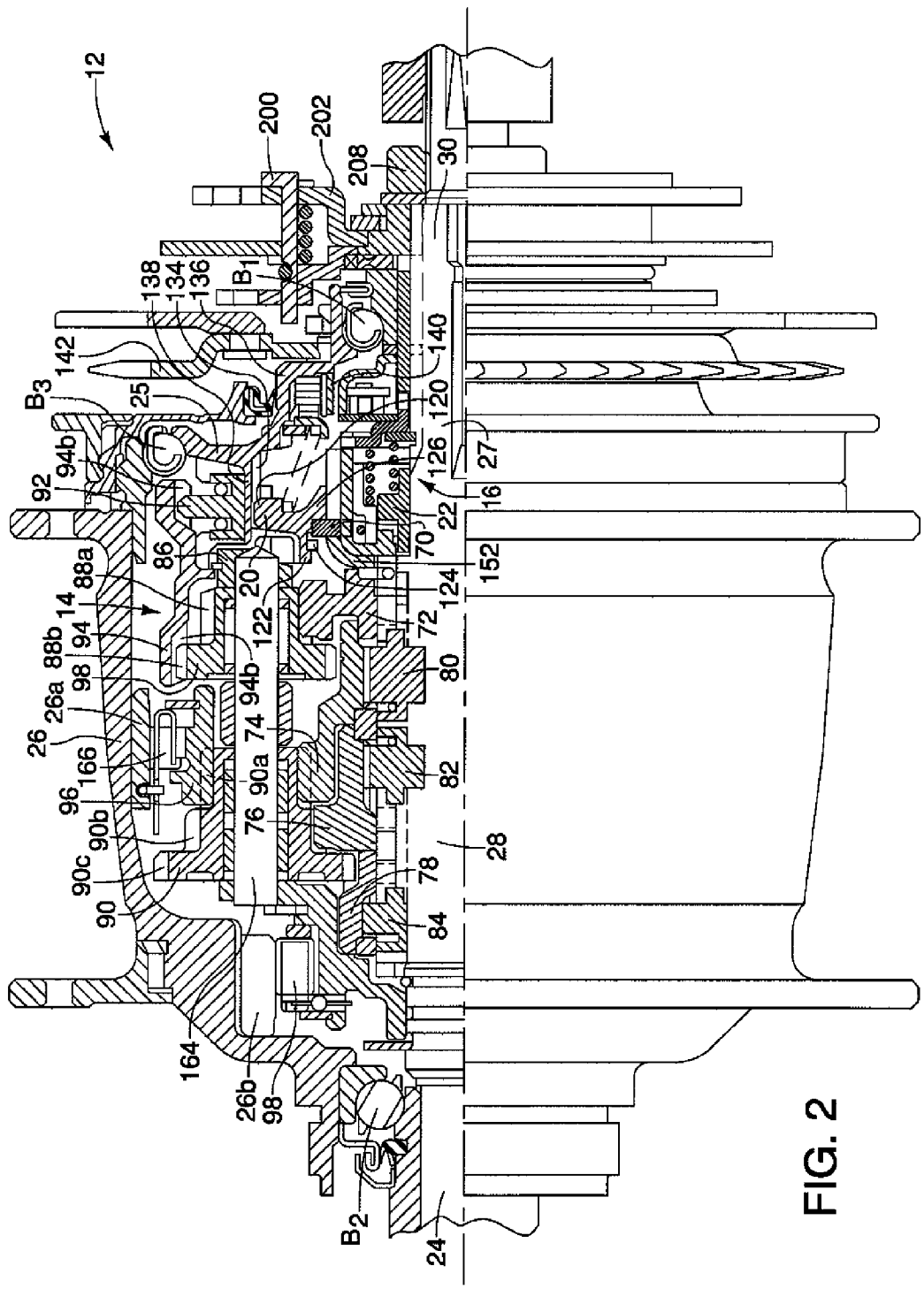
FIG. 2 is a cross-sectional view of the hub assembly showing various portions of the hub assembly including a power transmission assembly with a shift mechanism in accordance with a first embodiment of the present invention.

As shown in FIG. 2, the hub assembly 12 includes a power transmission assembly 14 that has a shift mechanism 16 (a shift control mechanism) that controls movement of a pawl control member 18 (see FIGS. 3-5, 7 and 8) and a clutch ring 20. The pawl control member 18 and the clutch ring 20 are selectively movable to a combination of positions in order to configure various elements of the power transmission assembly 14 to transmit torque along a plurality of power transmission paths indicated in FIGS. 59-66 and described in greater detail below. Further, the shift mechanism 16 of present invention includes an indexing ring or positioner 22 configured to accurately locate the pawl control member 18 to discreet positions corresponding to the power transmission path selectable by a cyclist.

As shown in FIG. 2, the hub assembly 12 basically includes a hub axle 24, a driver 25, a hub shell 26, the power transmission assembly 14 and the shift mechanism 16.

With specific reference to FIGS. 3, 4, 6 and 46, a brief description of the hub axle 24 is now provided. The hub axle 24 is basically an elongated shaft that is non-rotatably mounted to the rear frame of the bicycle 10 in a conventional manner. The hub axle 24 includes shift control support portion 27 and a transmission support portion 28.

Figure 45:
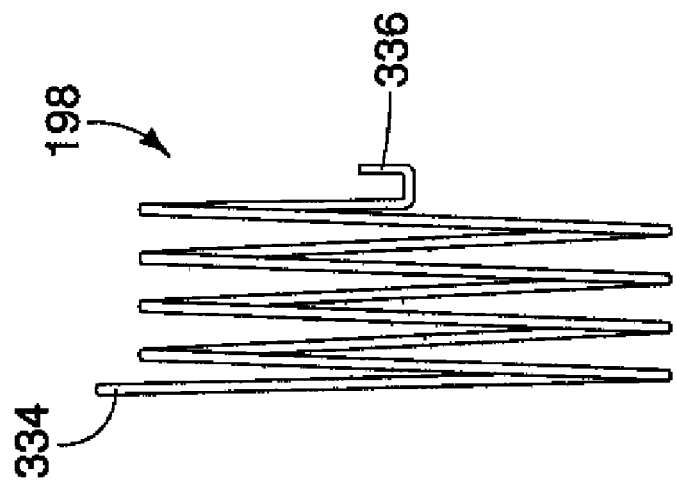
FIG. 45 is part cross-sectional side view of the biasing spring shown removed from the hub assembly in accordance with the first embodiment of the present invention.

The shift control support portion 27 of the hub axle 24 has a generally uniform diameter and includes a pair of axially extending grooves 30 (only one groove 30 visible in FIGS. 3 and 4) formed in a portion thereof. The shift control support portion 27 also includes three projections 32, 34 and 36 that are best shown in FIG. 45. Only the projections 32 and 34 are visible in FIGS. 3 and 4. The shift control support portion 27 also includes an annular recess 38.

Figure 3:
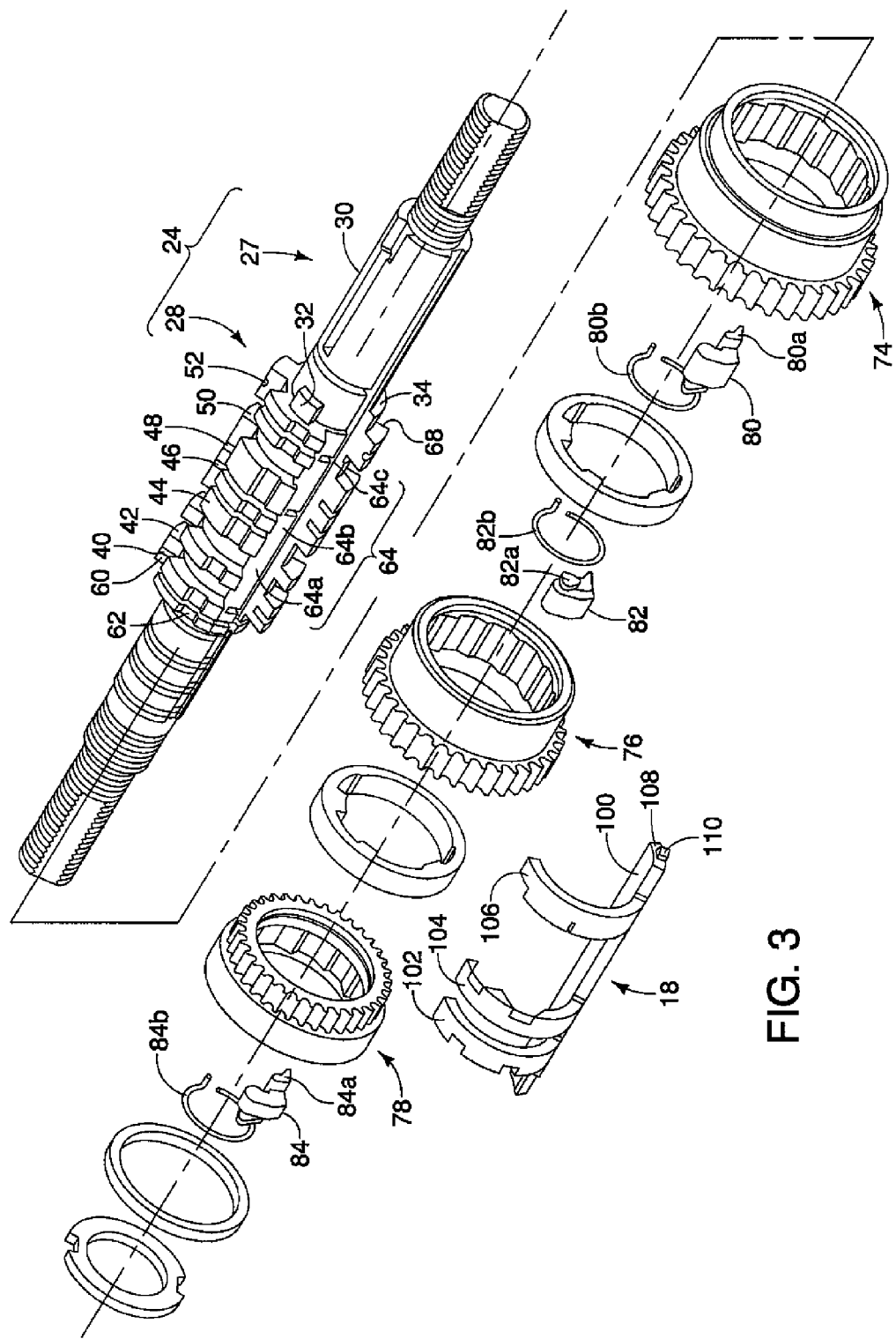
FIG. 3 is an exploded view of a portion of the hub assembly showing elements of the power transmission assembly without the shift mechanism in accordance with the first embodiment of the present invention.
Figure 46:
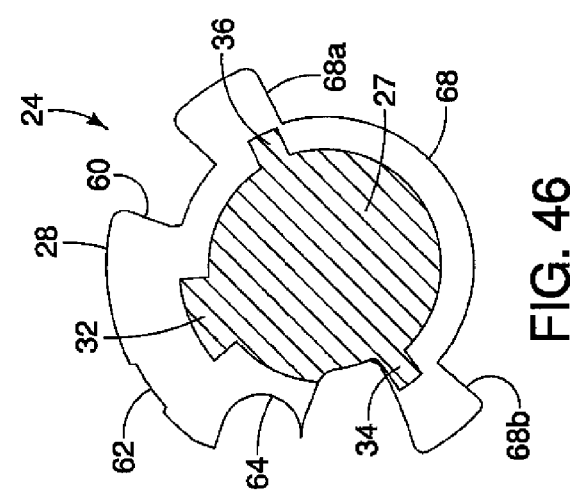
FIG. 46 is a cross-sectional end view of the hub axle shown removed from the hub assembly in accordance with the first embodiment of the present invention.

As indicated in FIG. 2 and best shown in FIGS. 3 and 6, the transmission support portion 28 of the hub axle 24 is dimensioned to receive and retain various portions of the power transmission assembly 14. The transmission support portion 28 of the hub axle 24 basically includes lobes or protrusions with an overall diameter larger than the outer diameter of the shift control support portion 27. The transmission support portion 28 further includes a series of circumferentially extending recesses and axially extending grooves that intersect with one another. Specifically as shown in FIGS. 3 and 6, the transmission support portion 28 includes the following circumferentially extending recesses: a spring retaining recess 40, a first pawl control arm receiving recess 42, a second pawl control arm receiving recess 44, spring receiving recesses 46 and 48, a third pawl control arm receiving recess 50 and a spring receiving recess 52. Further, the transmission support portion 28 includes the following axially extending grooves: a first locking groove 60, a second locking groove 62, a pawl receiving groove 64 that includes a first, second and third portion 64a, 64b and 64c and a control arm receiving groove 68 that is best shown in FIG. 46. These grooves and recesses of the transmission support portion 28 receive elements the power transmission assembly 14, as described below.

As best shown in FIG. 2, the driver 25 is rotatably supported about the hub axle 24 in a conventional manner by conventional bearings $B_1$ and the hub shell 26 is rotatably supported to the hub axle 24 and the driver 25 in a conventional manner by conventional bearings $B_2$ and $B_3$. The driver 25 can be selectively coupled to the hub shell 26 by the power transmission assembly 14 such that torque applied to the driver 25 is transmitted to the hub shell 26 in any one of a plurality of selected power transmission paths described below. A more detailed description of the driver 25 is provided below.

The hub shell 26 includes first torque transmission gear teeth 26a (right side of FIG. 2) and second torque transmission gear teeth 26b (left side of FIG. 2, whose function is described in greater detail below.

The power transmission assembly 14 is a multi-speed internal hub transmission. The power transmission assembly 14 basically includes (among other things) the pawl control member 18, the clutch ring 20, the driver 25, a ring shaped shift key member 70, a first sun gear 72, a second sun gear 74, a third sun gear 76, a fourth sun gear 78, a second sun gear pawl 80, a third sun gear pawl 82, a fourth sun gear pawl 84, a planet gear carrier 86, a first set of planet gears 88, a second set of planet gears 90, a pawl 92, a first ring gear 94, a second ring gear 96, a pawl 98 and the shift mechanism 16. The power transmission mechanism 14 is operably disposed between the driver 25 and the hub shell 26 for communicating rotational power from the driver 25 to the hub shell 26 through a plurality of differing torque transmission paths, as described below.

Figure 4:
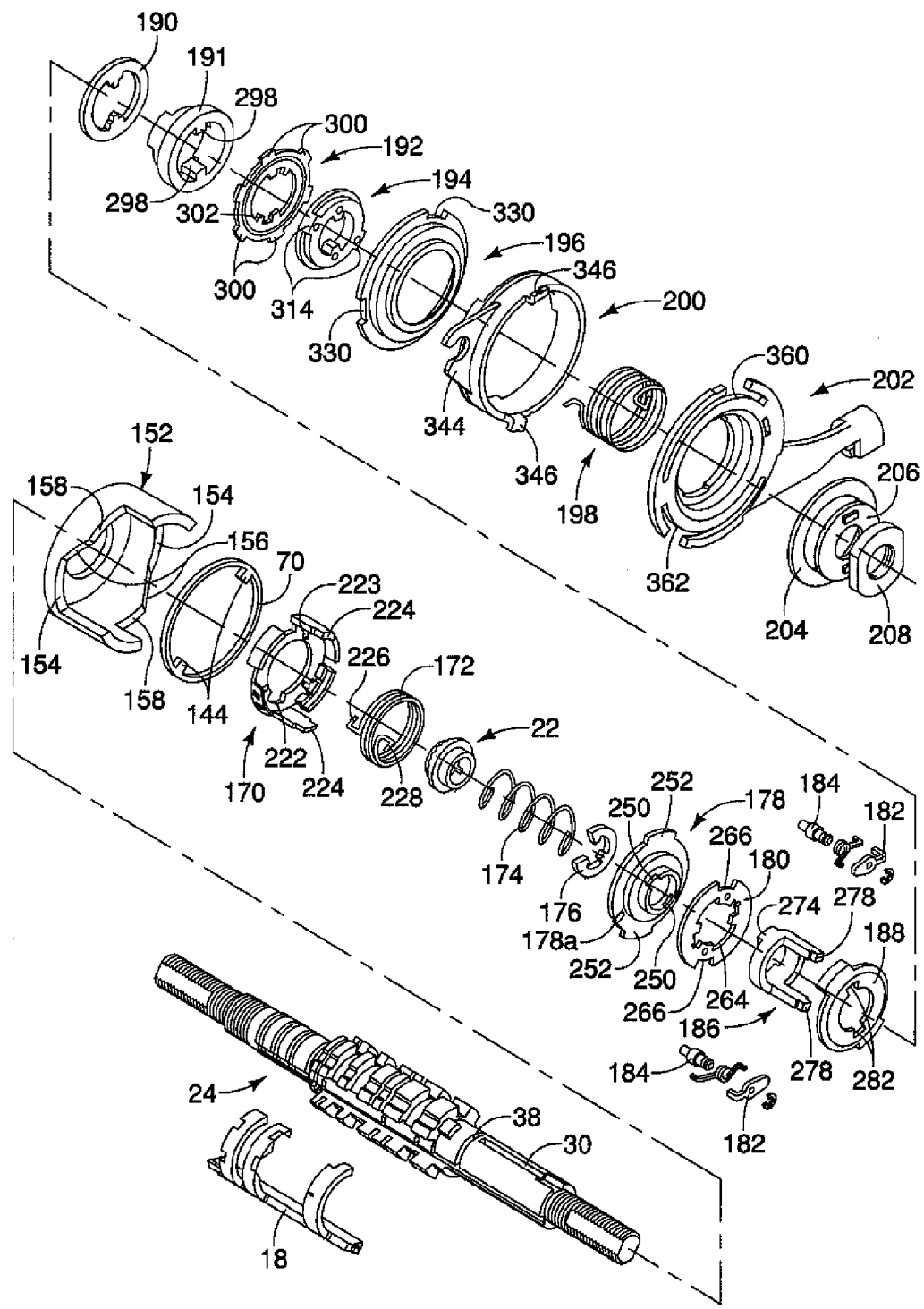
FIG. 4 is an exploded view of a portion of the hub assembly showing elements of the shift mechanism including a hub axle, a pawl control member, a clutch ring, a shifting key guide, a positioner, a spring washer, a pawl support, a shift sleeve, a pawl control washer, a holding plate, an actuator plate, a first spacer, a coupling plate, a cable bracket, a rotatable cable bracket, a fixed cable bracket, a washer, a second spacer and a biasing spring (among other elements) in accordance with the first embodiment of the present invention.
Figure 9:
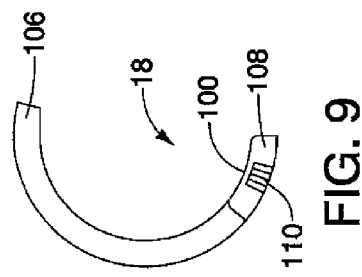
FIG. 9 is an end elevational view of the pawl control member shown removed from the hub assembly in accordance with the first embodiment of the present invention.

A description of the pawl control member 18 is now provided with specific reference to FIGS. 2, 3 and 4. The pawl control member 18 is a shift controller that basically includes a base sleeve 100, a first control sleeve 102, a second control sleeve 104, a third control sleeve 106 and a distal end 108 of the base sleeve 100. The base sleeve 100 is an elongated straight portion that extends approximately the length of the transmission support portion 28 of the hub axle 24. As shown in FIG. 5, with the hub assembly 12 fully assembled: the base sleeve 100 is disposed within the control arm receiving groove 68 of the transmission support portion 28 of the hub axle 24; the first control sleeve 102 is disposed within the first pawl control arm receiving recess 42; the second control sleeve 104 is disposed within the second pawl control arm receiving recess 44; and the third control sleeve 106 is disposed within the third pawl control arm receiving recess 50.

Figure 48:
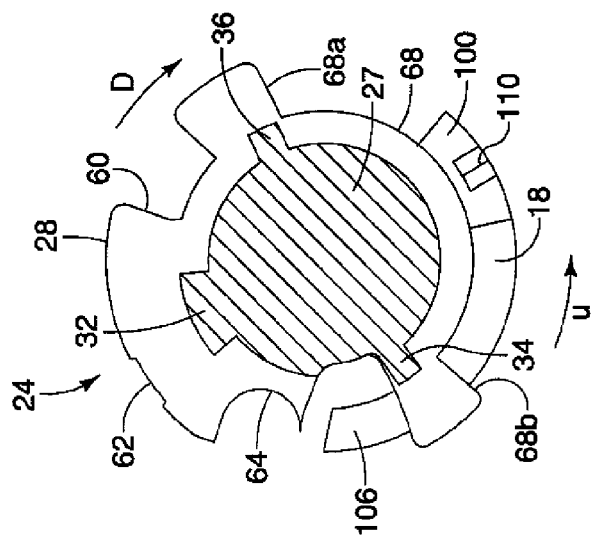
FIG. 48 is yet another cross-sectional end view of the hub axle with the pawl control member installed to the hub axle, with the pawl control member in a second rotational position in accordance with the first embodiment of the present invention.
Figure 47:
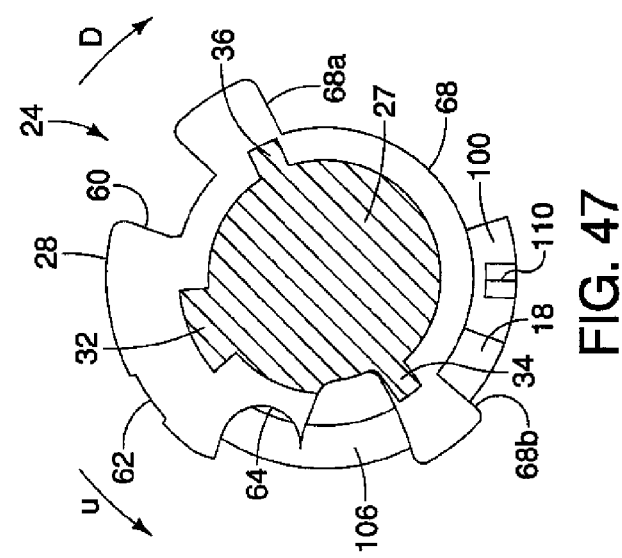
FIG. 47 is another cross-sectional end view of the hub axle with the pawl control member installed to the hub axle, with the pawl control member in a first rotational position in accordance with the first embodiment of the present invention.

During the shifting process, the first control sleeve 102, the first pawl control arm receiving recess 42, the second control sleeve 104, the second pawl control arm receiving recess 44, the third control sleeve 106 and the third pawl control arm receiving recess 50 act as bearing surfaces. More specifically, the first control sleeve 102 is circumferentially slidable within the first pawl control arm receiving recess 42; the second control sleeve 104 is circumferentially slidable within the second pawl control arm receiving recess 44; and the third control sleeve 106 is circumferentially slidable within the third pawl control arm receiving recess 50. Further, as the pawl control member 18 is circumferentially displaced about the hub axle 24, the circumferential movement is limited mainly by the base sleeve 100 contacting the surfaces on either circumferential side of the control arm receiving groove 68, as indicated in FIGS. 47 and 48. In FIG. 47 the pawl control member 18 is rotated to one position and in FIG. 48, the pawl control member 18 is rotated to another position.

Figure 7:
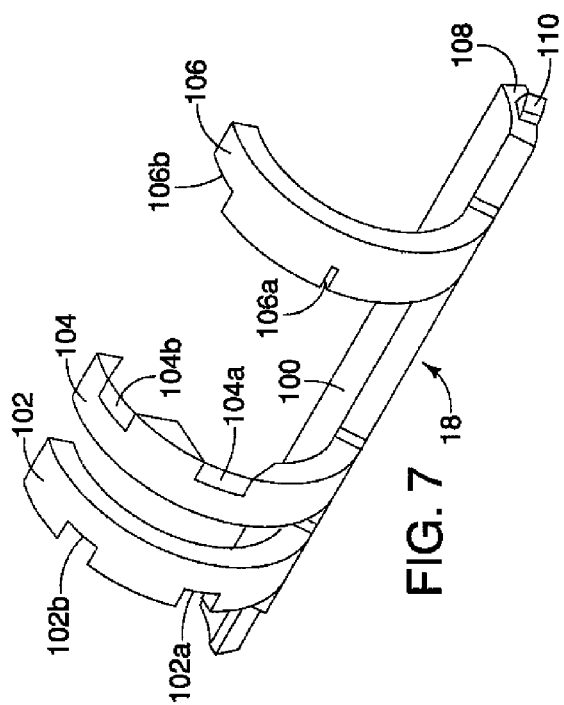
FIG. 7 is a perspective view of the pawl control member shown removed from the hub assembly in accordance with the first embodiment of the present invention.
Figure 8:
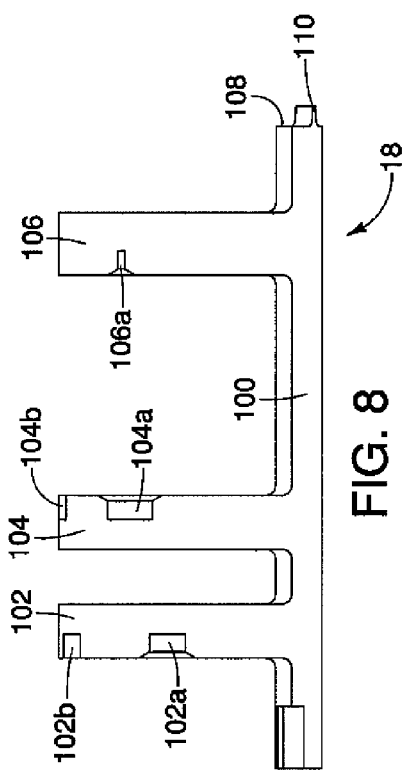
FIG. 8 is a side elevational view of the pawl control member shown removed from the hub assembly in accordance with the first embodiment of the present invention.
Figure 19:
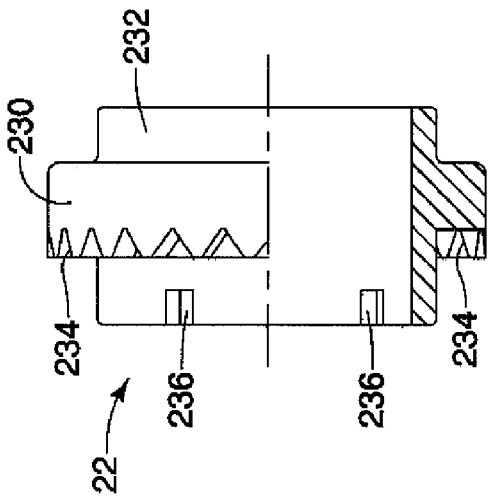
FIG. 19 is a part cross-sectional side view of the positioner shown removed from the hub assembly in accordance with the first embodiment of the present invention.
Figure 20:
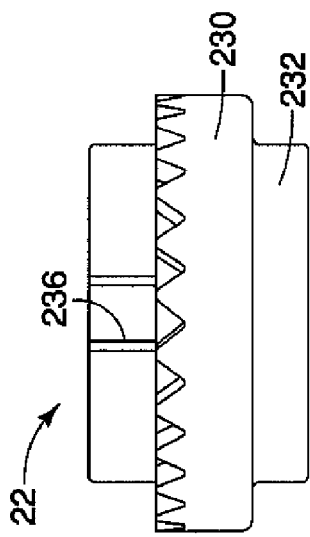
FIG. 20 is a side plan view of the positioner shown removed from the hub assembly in accordance with the first embodiment of the present invention.
Figure 18:
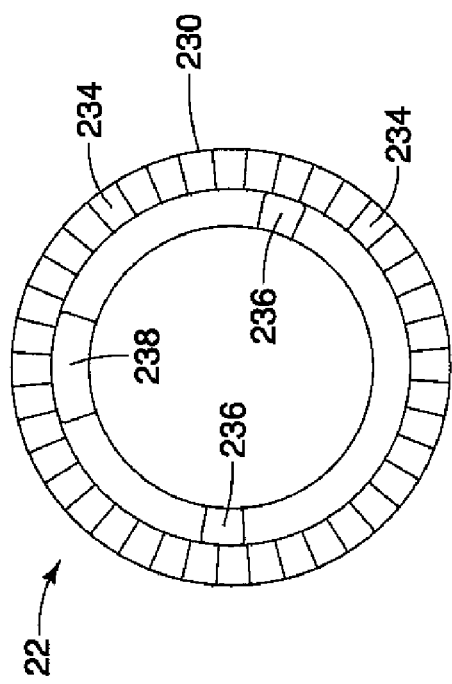
FIG. 18 is an end plan view of the positioner shown removed from the hub assembly in accordance with the first embodiment of the present invention.

As best shown in FIGS. 7 and 8, the first control sleeve 102 of the pawl control member 18 includes pawl control recesses 102a and 102b. With the hub assembly 12 fully assembled, the first control sleeve 102 is disposed within the first pawl control arm receiving recess 42 of the hub axle 24, as shown in FIG. 5. The pawl control recesses 102a and 102b are dimensioned to interact with a projection 84a of the fourth sun gear pawl 84. For example, when the pawl control member 18 is moved to select a power transmission path, the projection 84a of the fourth sun gear pawl 84 can move into one or the other of the pawl control recesses 102a and 102b and the fourth sun gear pawl 84 moves radially outward. As a result, the fourth sun gear pawl 84 engages an inner surface of the fourth sun gear 78 such that the fourth sun gear 78 no longer rotates relative to the hub axle 24.

As best shown in FIGS. 7 and 8, the second control sleeve 104 of the pawl control member 18 includes pawl control recesses 104a and 104b. With the hub assembly 12 fully assembled, the second control sleeve 104 is disposed within the second pawl control arm receiving recess 44 of the hub axle 24, as shown in FIG. 5. The pawl control recesses 104a and 104b are dimensioned to interact with a projection 82a of the third sun gear pawl 82. For example, when the pawl control member 18 is moved to select a power transmission path, the projection 82a of the third sun gear pawl 82 can move into one or the other of the pawl control recesses 104a and 104b and the third sun gear pawl 82 moves radially outward. As a result, the third sun gear pawl 82 engages an inner surface of the third sun gear 76 such that the third sun gear 76 no longer rotates relative to the hub axle 24.

As best shown in FIGS. 7 and 8, the third control sleeve 106 of the pawl control member 18 includes pawl control recesses 106a and 106b. With the hub assembly 12 fully assembled, the third control sleeve 106 is disposed within the third pawl control arm receiving recess 50 of the hub axle 24, as shown in FIG. 5. The pawl control recesses 106a and 106b are dimensioned to interact with a projection 80a of the second sun gear pawl 80. For example, when the pawl control member 18 is moved to select a power transmission path, the projection 80a of the second sun gear pawl 80 can move into one or the other of the pawl control recesses 106a and 106b and the second sun gear pawl 80 moves radially outward. As a result, the second sun gear pawl 80 engages an inner surface of the second sun gear 74 such that the second sun gear 74 no longer rotates relative to the hub axle 24.

The positioning of the pawl control member 18 determines which power transmission path or gear ratio is engaged within the hub assembly 12. In the embodiment of the invention described herein, there are eight power transmission paths (described below). It should be understood from the drawings and description herein that the present invention can be used with hub assemblies having any of a variety of power transmission paths and is not limited to use with a hub assembly having eight power transmission paths. For example, the present invention can be used in a hub assembly having just two power transmission paths or more, 10 or more power transmission paths.

The distal end 108 of the base sleeve 100 of the pawl control member 18 includes a single gear tooth 110 that extends in a radial direction relative to the axial center of the hub axle 24, as indicated in FIGS. 3, 4 and 5. The function of the gear tooth 110 is described below.

Figure 10:
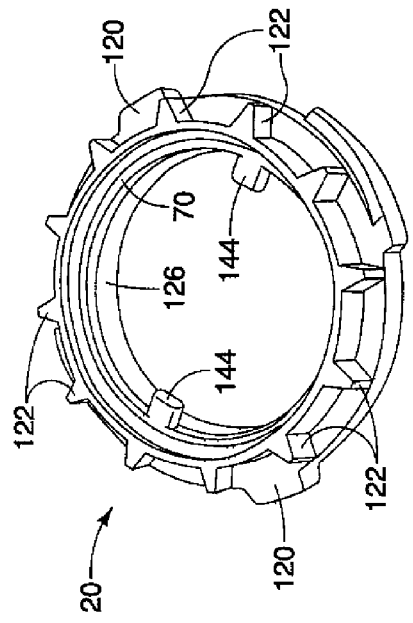
FIG. 10 is a perspective view of the clutch ring shown removed from the hub assembly in accordance with the first embodiment of the present invention.
Figure 53:
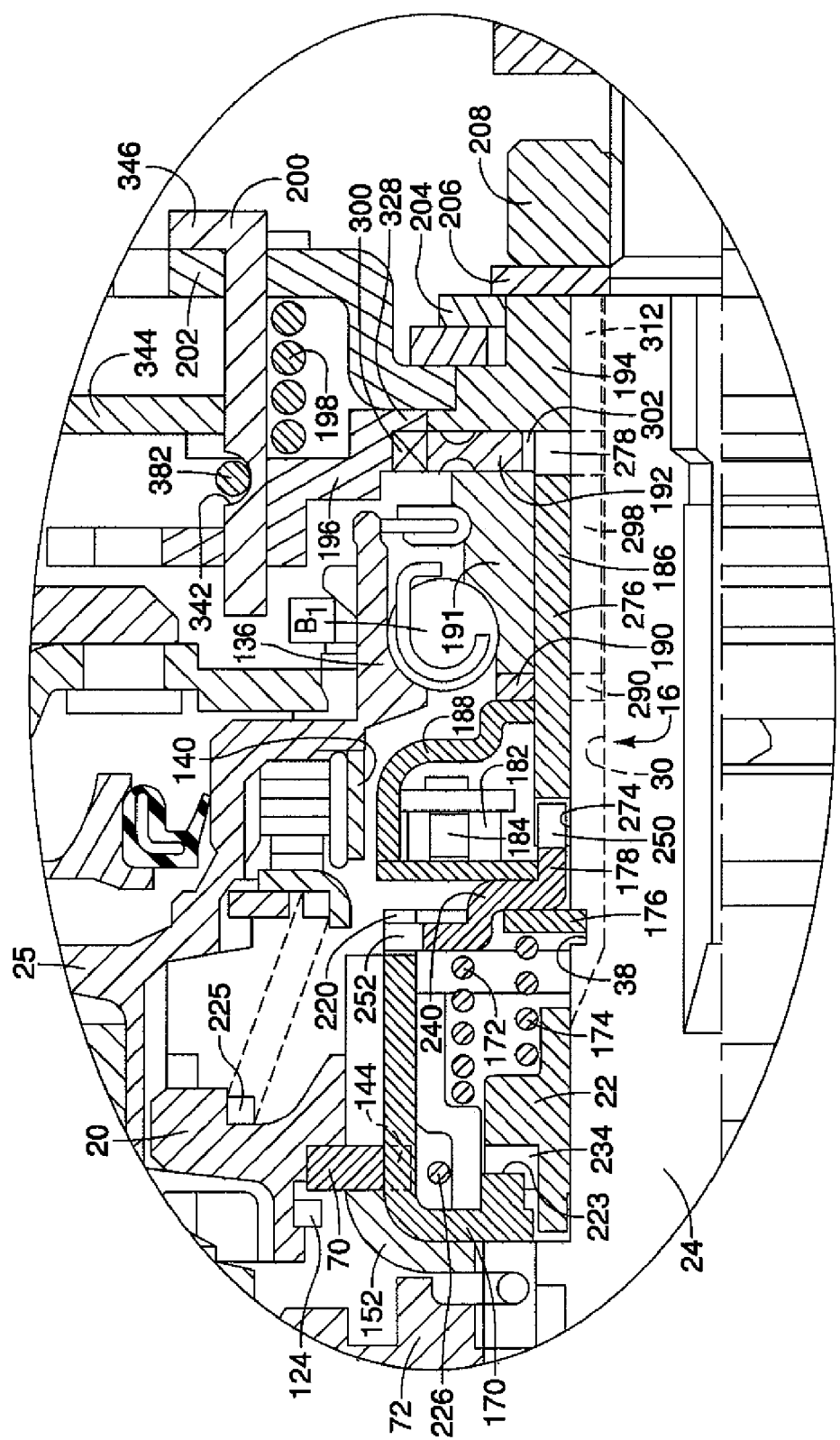
FIG. 53 is an enlarged portion of the cross-sectional view of FIG. 2, showing a portion of the hub assembly with the clutch ring in engaged with a first sun gear of the hub assembly in accordance with the first embodiment of the present invention.
Figure 54:
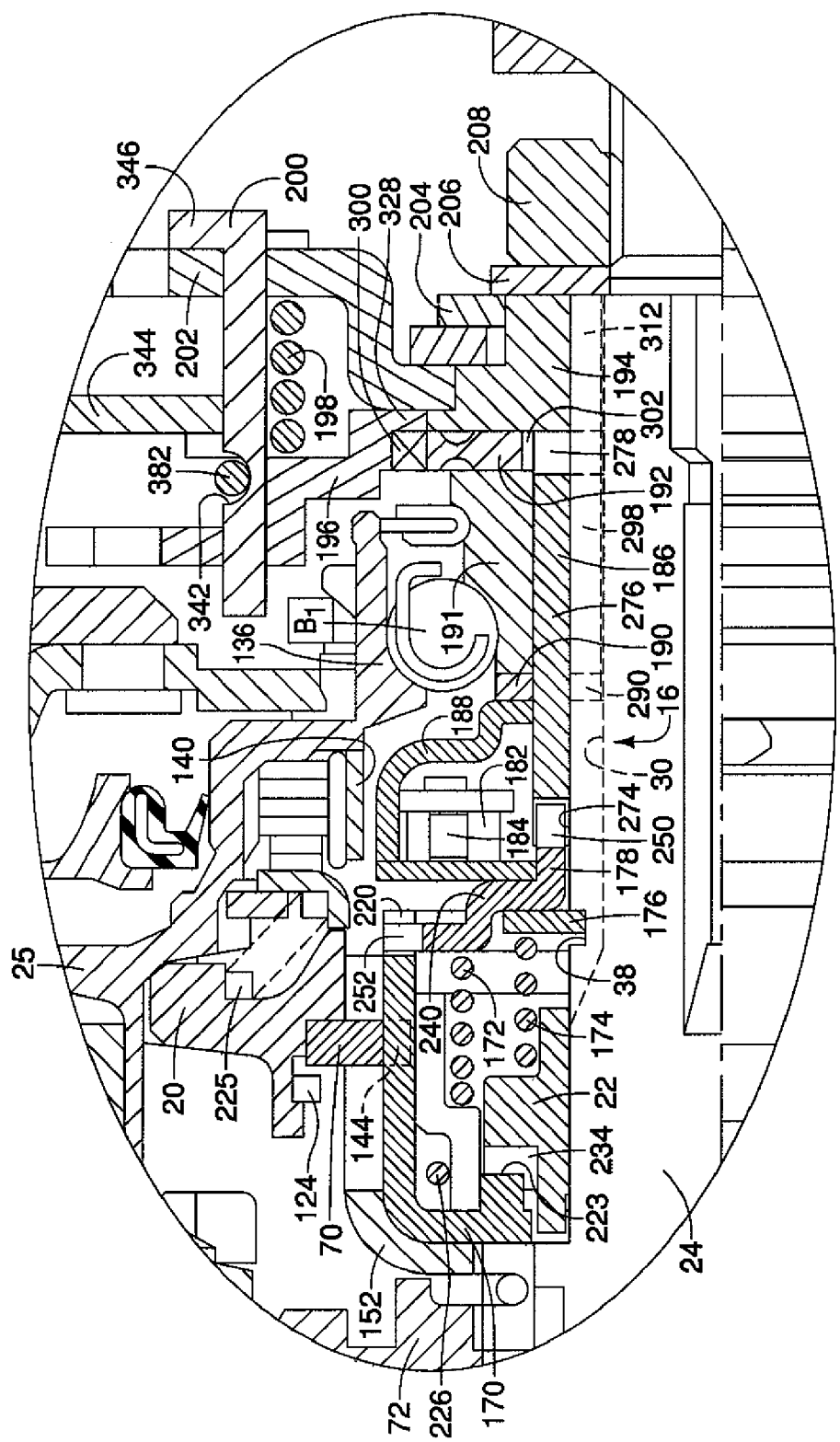
FIG. 54 is a cross-sectional view similar to FIG. 53, showing a portion of the hub assembly with the clutch ring disengaged from the first sun gear of the hub assembly in accordance with the first embodiment of the present invention.

As shown in FIGS. 2 and 10, the clutch ring 20 is an annular member with a first set of gear teeth 120 and a second set of gear teeth 122 on an outer periphery thereof. An inner peripheral surface of the clutch ring 20 includes a retaining clip 124 and a radially inward extending portion 126. The shift key member 70 is axially confined between the retaining clip 124 and the radially inward extending portion 126. The clutch ring 20 is disposed radially inward from the hub shell 26 and the driver 25 and radially outward from the shift mechanism 16. The clutch ring 20 can undergo limited movement in an axial direction relative to the hub axle 24 and is rotatable about the hub axle 24, as indicated in FIGS. 53 and 54.

With reference again to FIG. 2, a description of the driver 25 is now provided. The driver 25 is a generally annular member with several differing diameter portions that is rotatably supported about the hub axle 24 by the bearings $B_1$ in a conventional manner. The driver 25 further supports the bearings $B_3$ that support the hub shell 26.

The driver 25 includes gear teeth 134 on a radially inward surface thereof a chain sprocket support portion 136, a pawl engaging portion 138 on a radially outward portion and shift assist gear teeth 140 on a radially inward portion. The gear teeth 134 are dimensioned to mesh with the first set of gear teeth 120 of the clutch ring 20 such that the clutch ring 20 always rotates with the driver 25. However, the clutch ring 20 is configured to move in an axial direction along the length of the gear teeth 134, as described below. The chain sprocket support portion 136 of the driver 25 supports a chain sprocket 142 that is fixedly attached to the driver 25 for rotation therewith. The driver 25, the clutch ring 20 and the chain sprocket 142 rotate together as a single unit. The purpose of the pawl engaging portion 138 and the shift assist gear teeth 140 is explained below.

The clutch ring 20 is movable from a first position shown in FIGS. 54 and 59-62 to a second position shown in FIGS. 2, 53 and 63-66. In the first position shown in FIGS. 54 and 59-62, the clutch ring 20 is idle and rotates with the driver 25. Hence, with the clutch ring 20 in the first position, torque from the driver 25 is transmitted to the first ring gear 94 via the pawl 92 in a first group of first power transmission paths depicted in FIGS. 59-62, as described in greater detail below. In the second position shown in FIGS. 2, 53 and 63-66, the second set of gear teeth 122 of the clutch ring 20 engage and mesh with gear teeth of the plane gear carrier 86 and torque from the driver 25 is transmitted from the driver 25 to the plane gear carrier 86 in a second group of power transmission path depicted in FIGS. 63-66, as described in greater detail below. The clutch ring 20 is moved between the first and second positions by the shift mechanism 16, as described below. As described in greater detail below, the shift key member 70 functions to couple the clutch ring 20 to portions of the shift mechanism 16 for movement of the clutch ring 20 between the first position (FIG. 54) and the second position (FIG. 53) of the clutch ring 20.

A description of the shift key member 70 is now provided with specific reference to FIGS. 2, 4 and 10. The shift key member 70 is an annular ring-shaped member and includes a pair of radially inwardly extending cam followers 144. The outer annular portion of the shift key member 70 is confined between the retaining clip 124 and the radially inward extending portion 126 of the clutch ring 20, as described above and shown in FIGS. 2 and 10.

A description of the first sun gear 72 is now provided with specific reference to FIG. 2. The first sun gear 72 is non-rotatably supported on the hub axle 24 in a conventional manner. The first sun gear 72 includes radially outwardly extending gear teeth that mesh with small diameter gear teeth on the first set of planet gears 88 in a conventional manner.

As shown in FIG. 2, a cam portion 152 is located adjacent to the first sun gear 72. The cam portion 152 is non-rotatably installed on the transmission support portion 28 of the hub axle 24. As best shown in FIG. 4, the cam portion 152 includes a pair of first cam surfaces 154, second cam surfaces 156 and third cam surfaces 158. The cam portion 152 is configured to move the shift key member 70 and the clutch ring 20 between the first and second positions shown in FIGS. 53 and 54, as described in greater detail below. The shift key member 70 has an inner overall diameter (absent the pair of radially inwardly extending cam followers 144) that is slightly greater than an outer diameter of cam portion 152 of the first sun gear 72. However, the pair of radially inwardly extending cam followers 144 extend radially inward beyond an inner surface of the cam portion 152, as explained further below in the description of the shifting key guide 170.

A description of the second sun gear 74, the third sun gear 76 and the fourth sun gear 78 is now provided with specific reference to FIGS. 2 and 3. The second sun gear 74, the third sun gear 76 and the fourth sun gear 78 are all selectively rotatable relative to the axle 24. The second sun gear 74, the third sun gear 76 and the fourth sun gear 78 each have respective conventional internal pawl ratchet teeth and external gear teeth.

As shown in FIG. 3, the second sun gear pawl 80 includes a control portion 80a and a spring 80b. The control portion 80a of the second sun gear pawl 80 is pivotally retained within the third portion 64c of the recess 64 of the hub axle 24 such that the second sun gear pawl 80 can selectively pivot radially outward and ratchet against the internal pawl ratchet teeth of the second sun gear 74. The spring 80b is installed in the spring receiving recess 52 and biases the second sun gear pawl 80 outward. The second sun gear pawl 80 remains in position relative to the hub axle 24 and selectively engages the internal ratchet teeth of the second sun gear 74 in response to positioning of the pawl control member 18. More specifically, when one of the pawl control recesses 106a or 106b of the third control sleeve 106 aligns with the control portion 80a of the second sun gear pawl 80, the second sun gear pawl 80 moves radially outward to contact the internal ratchet teeth of the second sun gear 74 thereby allowing rotation of the second sun gear 74 in one rotational direction only. In other words, the second sun gear pawl 80 functions as a one-way clutch. Otherwise, contact between the control portion 80a with the remaining portions of the third control sleeve 106 pulls the second sun gear pawl 80 radially inward and the second sun gear 74 freewheels about the hub axle 24 in a conventional manner.

Similarly, the third sun gear pawl 82 includes a control portion 82a and a spring 82b. The control portion 82a of the third sun gear pawl 82 is pivotally retained within the second portion 64b of the recess 64 of the hub axle 24 such that the third sun gear pawl 82 can selectively pivot radially outward and ratchet against the internal pawl ratchet teeth of the third sun gear 76. The spring 82b is installed in the spring receiving recess 48 and biases the third sun gear pawl 82 outward. The third sun gear pawl 82 remains in position relative to the hub axle 24 and selectively engages the internal ratchet teeth of the third sun gear 76 in response to positioning of the pawl control member 18. More specifically, when one of the pawl control recesses 104a or 104b of the second control sleeve 104 aligns with the control portion 82a of the third sun gear pawl 82, the third sun gear pawl 82 moves radially outward to contact the internal ratchet teeth of the third sun gear 76 thereby allowing rotation of the third sun gear 76 in one rotational direction only. In other words, the third sun gear pawl 82 functions as a one-way clutch. Otherwise, contact between the control portion 82a with the remaining portions of the second control sleeve 104 pulls the third sun gear pawl 82 radially inward and the third sun gear 76 freewheels about the hub axle 24 in a conventional manner.

Similarly, the fourth sun gear pawl 84 includes a control portion 84a and a spring 84b. The control portion 84a of the fourth sun gear pawl 84 is pivotally retained within the first portion 64a of the recess 64 of the hub axle 24 such that the fourth sun gear pawl 84 can selectively pivot radially outward and ratchet against the internal pawl ratchet teeth of the fourth sun gear 78. The spring 84b is installed in the spring receiving recess 46 and biases the fourth sun gear pawl 84 outward. The fourth sun gear pawl 84 remains in position relative to the hub axle 24 and selectively engages the internal ratchet teeth of the third sun gear 76 in response to positioning of the pawl control member 18. More specifically, when one of the pawl control recesses 102a or 102b of the first control sleeve 102 aligns with the control portion 84a of the fourth sun gear pawl 84, the fourth sun gear pawl 84 moves radially outward to contact the internal ratchet teeth of the fourth sun gear 78 thereby allowing rotation of the fourth sun gear 78 in one rotational direction only. In other words, the fourth sun gear pawl 84 functions as a one-way clutch. Otherwise, contact between the control portion 84a with the remaining portions of the first control sleeve 102 pulls the fourth sun gear pawl 84 radially inward and the fourth sun gear 78 freewheels about the hub axle 24 in a conventional manner.

As shown in FIG. 2, the planet gear carrier 86 is a conventional cage-like member with shafts that support the first set of planet gears 88 and the second set of planet gears 90. More specifically, the planet gear carrier 86 includes an annular shaped portion rotatably supported about the hub axle 24. The planet gear carrier 86 is configured to support and retain the first and second sets of planet gears 88 and 90 in a conventional manner. The planet gear carrier 86 includes a smaller diameter portion 160 and a larger diameter portion 162. As shown at the left hand side of FIG. 2, smaller diameter portion 160 is located adjacent to the bearing assembly $B_2$. The larger diameter portion 162 of the planet gear carrier 86 includes a plurality of shafts 164 that support the sets of first and second planet gears 88 and 90 such that the first and second planet gears 88 and 90 freely rotate about the shafts 164 of the planet gear carrier 86. The larger diameter portion 162 also includes gear teeth adjacent to the clutch ring 20 configured to engage the second set of gear teeth 122 of the clutch ring 20 with the clutch ring 20 in the second position shown in FIGS. 2, 53 and 63-66.

The planet gear carrier 86 preferably supports three of the first set of planet gears 88 (only one is shown in FIG. 2) and three of the second set of planet gears 90 (only one is shown in FIG. 2). Each of the first set of planet gears 88 includes a small diameter set of gear teeth 88a and a large diameter set of gear teeth 88b. The small diameter set of gear teeth 88a mesh with the external gear teeth of the first sun gear 72. The large diameter set of gear teeth 88b of the first sun gear 72 mesh with internal gear teeth of the first ring gear 94.

Each of the second set of planet gears 90 includes a small diameter set of gear teeth 90a, an intermediate diameter set of gear teeth 90b and a set of large diameter set of gear teeth 90c. The small diameter set of gear teeth 90a mesh with the external gear teeth of the second sun gear 74 and internal gear teeth of the second ring gear 96. The intermediate diameter set of gear teeth 90b mesh with external gear teeth of the third sun gear 76. The large diameter set of gear teeth 90c mesh with external gear teeth of the fourth sun gear 78.

The pawl 92 is disposed between the pawl engaging portion 138 of the driver 25 and a portion of the first ring gear 94. The pawl 92 acts as a one way clutch for the transmission of torque from the driver 25 to the first ring gear 94.

As shown in FIG. 2, the first ring gear 94 is an annular member that encircles the first planet gears 88, a portion of the large diameter portion 162 of the planet gear carrier 86 and the pawl 92b. The first ring gear 94 is rotatable relative to the axle 24, the hub shell 26 and the planet gear carrier 86. The first ring gear 94 includes a plurality of internal ratchet teeth 94a and internal gear teeth 94b. The internal gear teeth 94b mesh with the large diameter gear teeth 88a of the first planet gears 88. The internal ratchet teeth 94a are configured for engagement with the pawl 92. The pawl 98 acts as a one way clutch that allows the first ring gear 94 to rotate in only one direction relative to the driver 25.

As shown in FIG. 2, the second ring gear 96 is coupled to the hub shell 26 via a one-way clutch in the form of a roller clutch 166 having a plurality of conventional rollers and cam surfaces.

As shown in FIG. 2, the pawl 98 is retained in a portion of the small diameter portion 100 of the planet gear carrier 86 in a conventional manner. The pawl 98 acts as a one way clutch for the transmission of torque from the planet gear carrier 86 to the hub shell 26.

The general operation and function of the second, third and fourth sun gears 80, 82 and 84, the planet gear carrier 86 and the first and second sets of planet gears 88 can also be found in, for example, U.S. Pat. No. 6,607,465 to Shoge (assigned to Shimano Inc.).

With initial reference to FIG. 4, a description of the shift mechanism 16 is now provided. The shift mechanism 16 basically includes the following elements: the pawl control member 18, the shift key member 70, a shifting key guide 170, a circumferential biasing spring 172, the positioner 22, an axial biasing spring 174, a clip 176, a spring washer 178, a pawl support 180, a pair of pawls 182, a pair of pawl shafts 184, a shift sleeve 186, a pawl control washer 188, a holding plate 190, a bearing cone 191, an actuator plate 192, a spacer 194, a coupling plate 196, a spring 198, a rotatable cable bracket 200 and a fixed cable bracket 202.

It should be appreciated from the following description, that the relative dimensions of the elements depicted in FIG. 4 are not necessarily to scale. For instance, the inner and outer diameters of the various elements may not be exactly to scale with the adjacent element. Rather, the relative dimensional relationships between the various elements of the shift mechanism 16 are best indicated in FIGS. 2, 53 and 54, as well as by the operating relationships between the various elements as described below.

The pawl control member 18 and the shift key member 70 of the shift mechanism 16 were described above. However, additional description of the pawl control member 18 and the shift key member 70 provided below is for the purpose of explaining the operational relationship between the pawl control member 18, the shift key member 70 and the various other elements of the shift mechanism 16.

Figure 51:
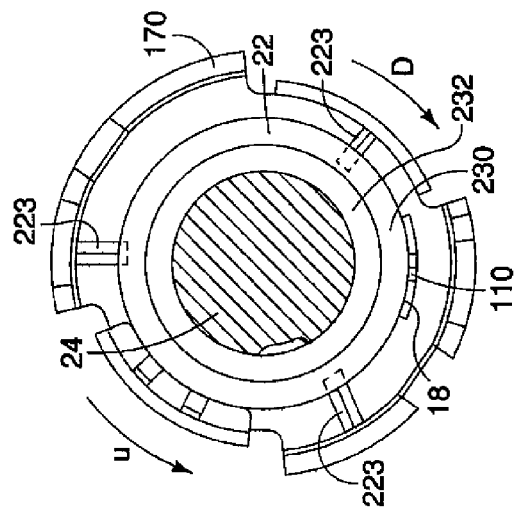
FIG. 51 is another cross-sectional end view of the hub axle with the pawl control member, the shifting key guide and the positioner installed to the hub axle in accordance with the first embodiment of the present invention.
Figure 50:
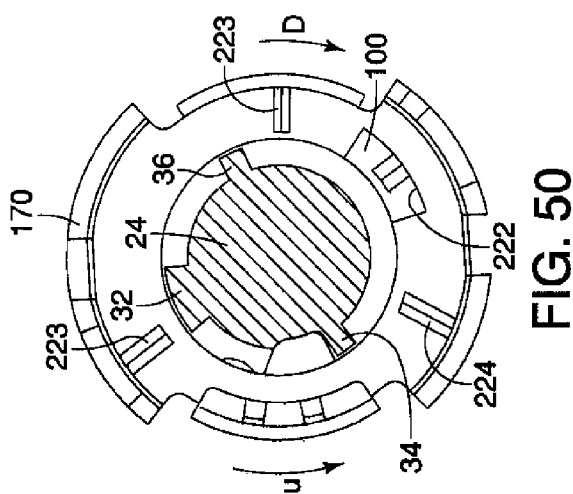
FIG. 50 is another cross-sectional end view of the hub axle with the pawl control member and the shifting key guide installed to the hub axle, with the pawl control member and the shifting key guide in the second rotational position in accordance with the first embodiment of the present invention.
Figure 49:
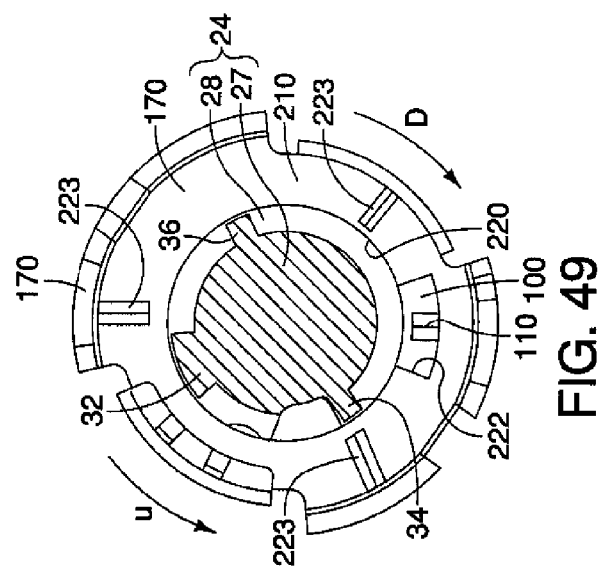
FIG. 49 is another cross-sectional end view of the hub axle with the pawl control member and the shifting key guide installed to the hub axle, with the pawl control member and the shifting key guide in the first rotational position in accordance with the first embodiment of the present invention.

With specific reference to FIGS. 11-14 and 49-51, a description is now provided for the shifting key guide 170. The shifting key guide 170 is rotatably disposed about the hub axle 124, as shown in FIGS. 49-51.

With reference to FIGS. 11-14, the shifting key guide 170 has an overall cup-like shape with a central disk portion 210 and surrounding pairs of arcuate wall portions 212, 214 and 216. he central disk portion 210 includes a central bore 220 (a central hub axle receiving aperture) that has a cut out or recess 222 and three gear tooth shaped projections 223 (see FIGS. 11, 12, 49 and 50). The central bore 220 is dimensioned to fit around a portion of the hub axle 24. Specifically, the central bore 220 has a diameter that is approximately the same or slightly larger than a diameter defined by an outer most surface of each of the projections 32, 34 and 36, as indicated in FIGS. 49 and 50. Hence, the shifting key guide 170 is rotatable about the hub axle 24 outward from the projections 32, 34 and 36.

The recess 222 of the central disk portion 210 of the shifting key guide 170 is dimensioned to receive the distal end 108 of the pawl control member 18, as indicated in FIGS. 49 and 50. Hence, when the shifting key guide 170 is rotated or undergoes circumferential displacement about the hub axle 24, the pawl control member 18 moves about the hub axle 24 with the shifting key guide 170. In other words, the shifting key guide 170 and the pawl control member 18 rotate relative to the hub axle 24 as a single unit.

Each of the gear tooth shaped projections 223 of the shifting key guide 170 has inclined flat surfaces defining an inverted V-shape. This V-shape matches or compliments the shape of the gear tooth 110 on the distal end 108 of the pawl control member 18. Further, a radially inner portion of the gear tooth shaped projections 223 (shown in phantom in FIG. 51) are circumferentially aligned with the gear tooth 110 on the distal end 108 of the pawl control member 18.

As shown best in FIGS. 11-13 and 52, the arcuate wall portions 212 of the shifting key guide 170 extends away from the central disk portion 210 farther than either of the arcuate wall portion 214 and 216. The ends of the arcuate wall portions 212 include contact portions 224. The contact portions 224 are dimensioned to contact portions of the pawl support 180, as described below.

The minimum interior diameter of the arcuate wall portions 212, 214 and 216 is larger than the biasing springs 172 and 174 and the positioner 22. Further, one end of the biasing spring 172, one end of the biasing spring 174 and the positioner 22 extend into the shifting key guide 170, as indicated in FIGS. 53 and 54.

Figure 55:
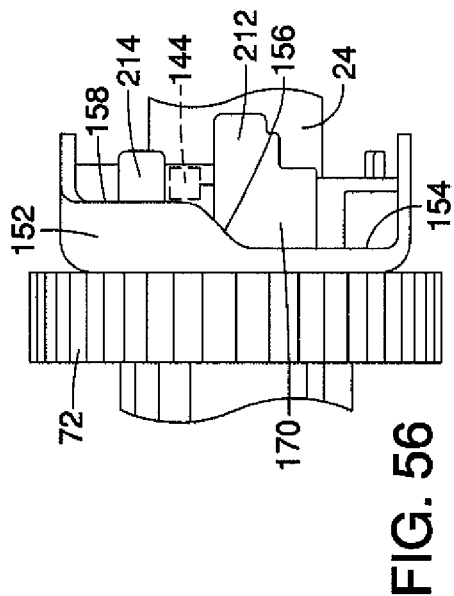
FIG. 55 is a part cutaway side elevational view of a portion of the hub assembly with many elements removed to reveal the hub axle, the first sun gear, the shifting key guide and one cam follower of the shift key member (in phantom) with the shifting key guide in a first orientation with the cam follower of the shift key member in a clutch ring engagement orientation in accordance with the first embodiment of the present invention.
Figure 56:
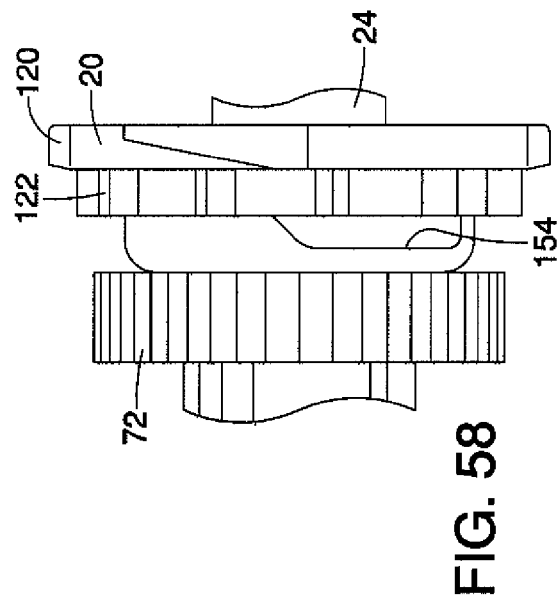
FIG. 56 is a part cutaway side elevational view of a portion of the hub assembly similar to FIG. 55, showing the hub axle, the first sun gear, the shifting key guide and the cam follower of the shift key member (in phantom) with the shifting key guide in a second orientation with the cam follower of the shift key member in a clutch dis-engaged orientation in accordance with the first embodiment of the present invention.

As mentioned above, the pair of radially inwardly extending cam followers 144 of the shift key member 70 extend radially inward into an interior of the cam portion 152. The pair of radially inwardly extending cam followers 144 further extend into a gap formed between the pairs of the arcuate wall portions 212 and 214, as indicated in FIGS. 55 and 56. The first sun gear 72 and the cam portion 152 of the first sun gear 72 cannot rotate relative to the hub axle 24. Therefore, when the shifting key guide 170 is rotated relative to the hub axle 24, the cam followers 144 are moved in an axial direction due to contact with the cam surface 156 of the cam portion 152 of the first sun gear 72. More specifically as shown in FIG. 55, in a first rotational position, the cam followers 144 contact the cam surfaces 154 of the cam portion 152 of the first sun gear 72. As shown in FIG. 56, as the shifting key guide 170 is rotated, the cam followers 144 contact the cam surface 156 and are then moved to the cam surface 158.

Figure 57:
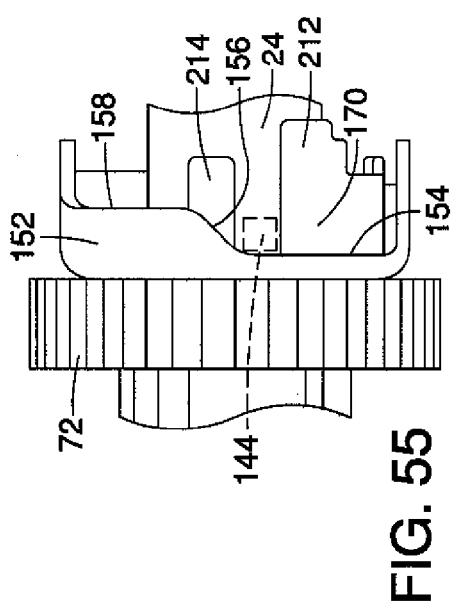
FIG. 57 is a part cutaway side elevational view of a portion of the hub assembly similar to FIG. 55, with the clutch ring installed over a portion of the first sun gear with the shifting key guide in the first orientation depicted in FIG. 55 with the clutch ring in the clutch ring engagement orientation in accordance with the first embodiment of the present invention.
Figure 58:
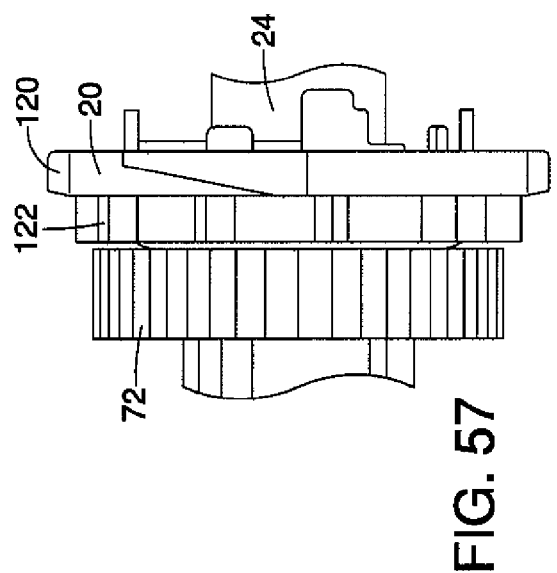
FIG. 58 is a part cutaway side elevational view of a portion of the hub assembly similar to FIG. 56, with the clutch ring installed over a portion of the first sun gear with the shifting key guide in the second orientation depicted in FIG. 56 with the clutch ring in the clutch ring disengagement orientation in accordance with the first embodiment of the present invention.
Figure 59:
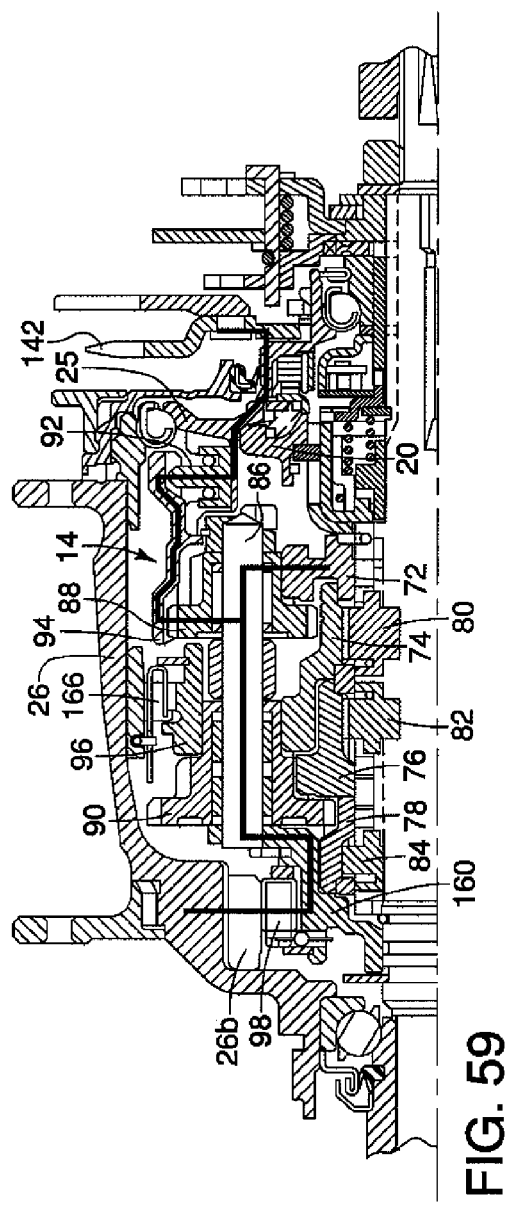
FIG. 59 is a cross-sectional view of a portion of the hub assembly similar to FIG. 2 showing a first power transmission path superimposed over those element of the power transmission assembly that define the first power transmission in accordance with the first embodiment of the present invention.
Figure 60:
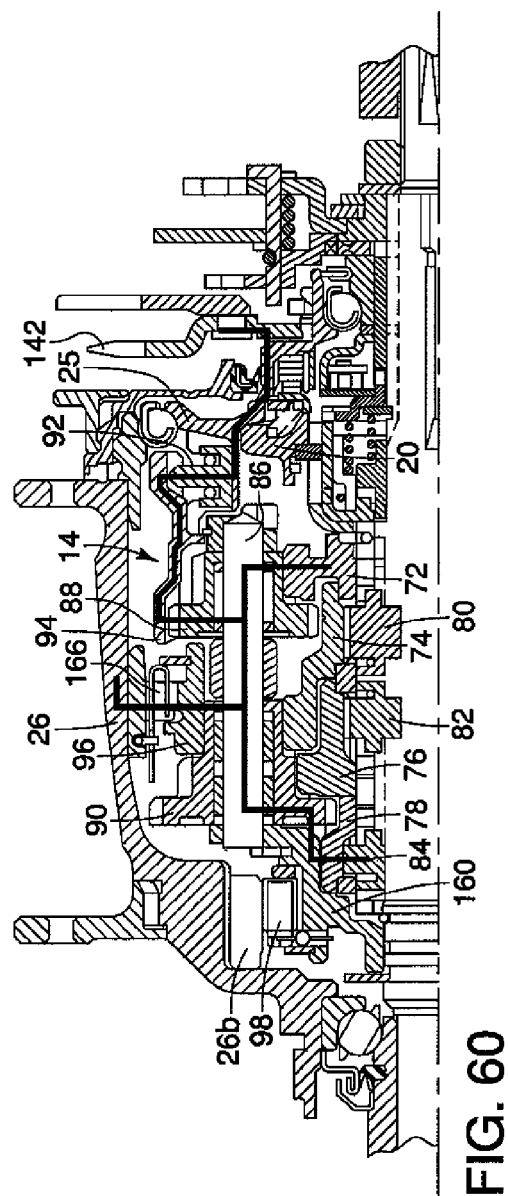
FIG. 60 is a cross-sectional view of a portion of the hub assembly similar to FIGS. 2 and 59 showing a second power transmission path superimposed over those element of the power transmission assembly that define the second power transmission in accordance with the first embodiment of the present invention.
Figure 61:
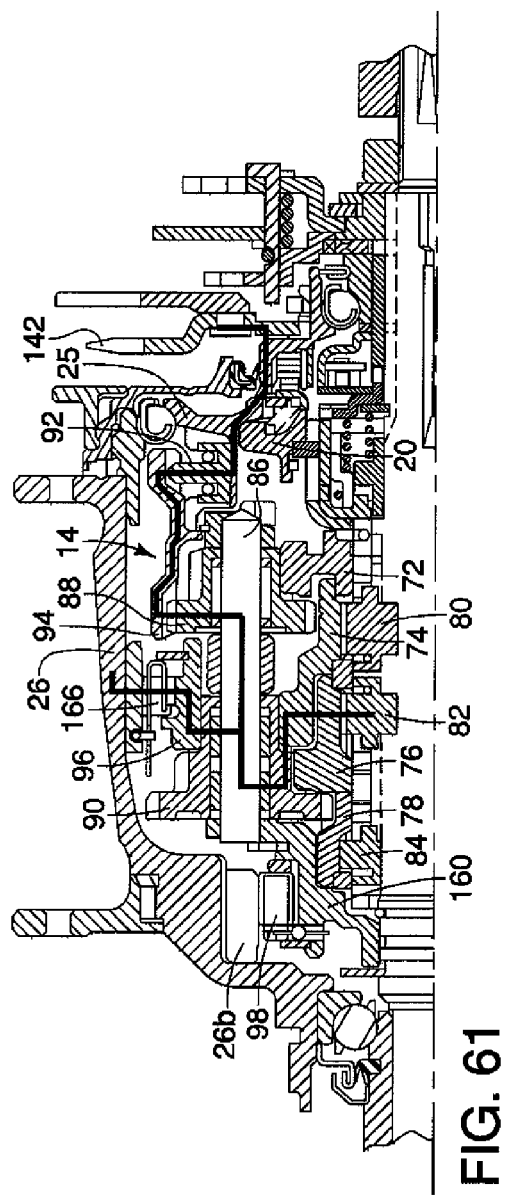
FIG. 61 is a cross-sectional view of a portion of the hub assembly similar to FIGS. 2, 59 and 60 showing a third power transmission path superimposed over those element of the power transmission assembly that define the third power transmission in accordance with the first embodiment of the present invention.
Figure 62:
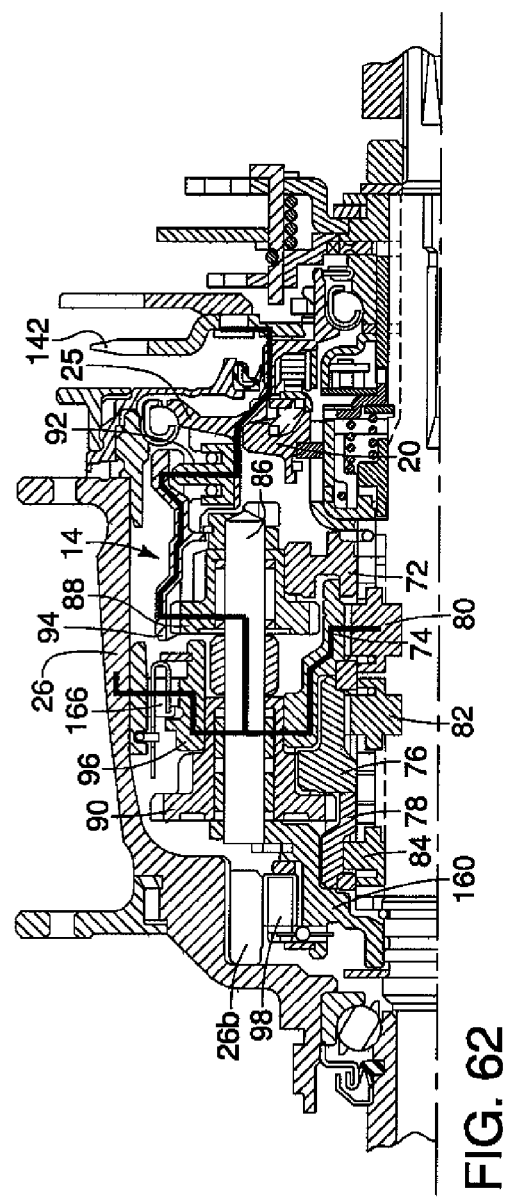
FIG. 62 is a cross-sectional view of a portion of the hub assembly similar to FIGS. 2 and 59-61 showing a fourth power transmission path superimposed over those element of the power transmission assembly that define the fourth power transmission in accordance with the first embodiment of the present invention.
Figure 63:
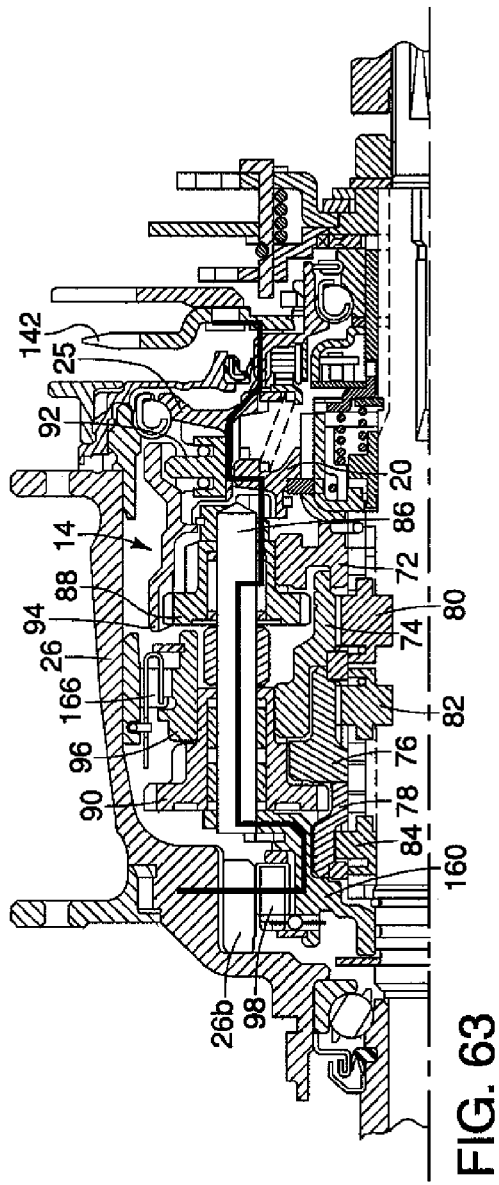
FIG. 63 is a cross-sectional view of a portion of the hub assembly similar to FIGS. 2 and 59-62 showing a fifth power transmission path superimposed over those element of the power transmission assembly that define the fifth power transmission in accordance with the first embodiment of the present invention.
Figure 64:
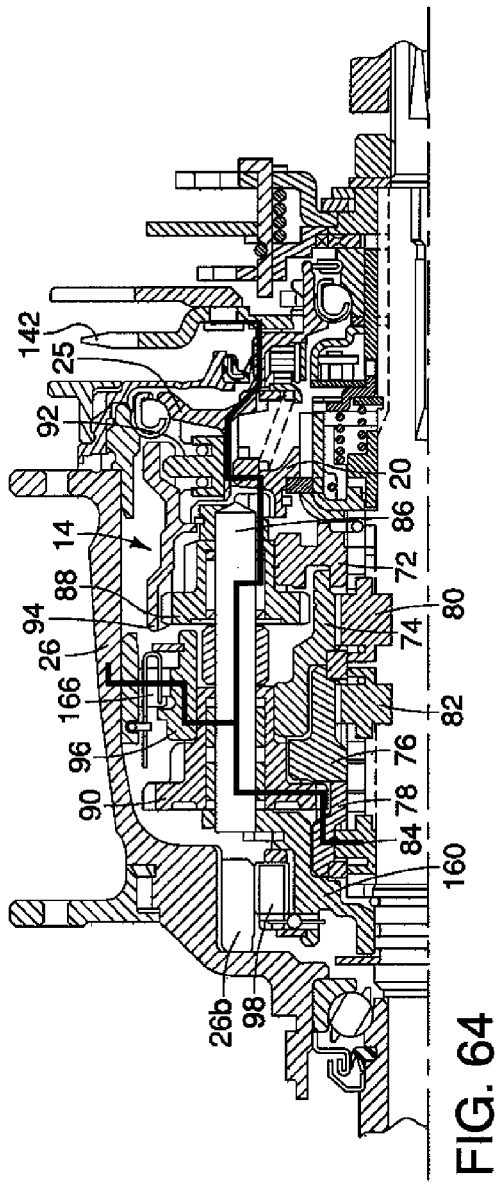
FIG. 64 is a cross-sectional view of a portion of the hub assembly similar to FIGS. 2 and 59-63 showing a sixth power transmission path superimposed over those element of the power transmission assembly that define the sixth power transmission in accordance with the first embodiment of the present invention.
Figure 65:
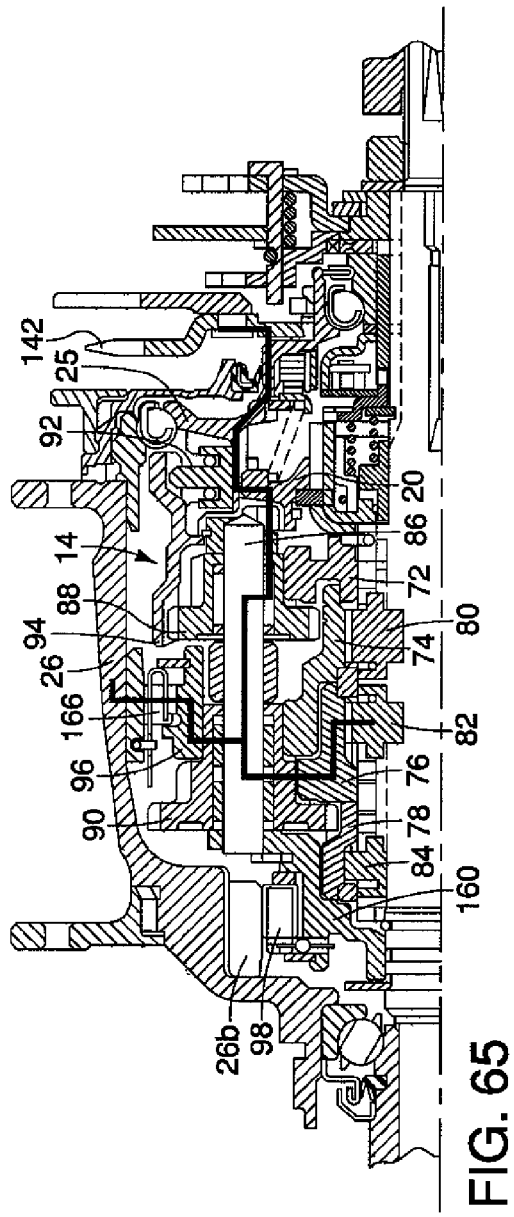
FIG. 65 is a cross-sectional view of a portion of the hub assembly similar to FIGS. 2 and 59-64 showing a seventh power transmission path superimposed over those element of the power transmission assembly that define the seventh power transmission in accordance with the first embodiment of the present invention.
Figure 66:
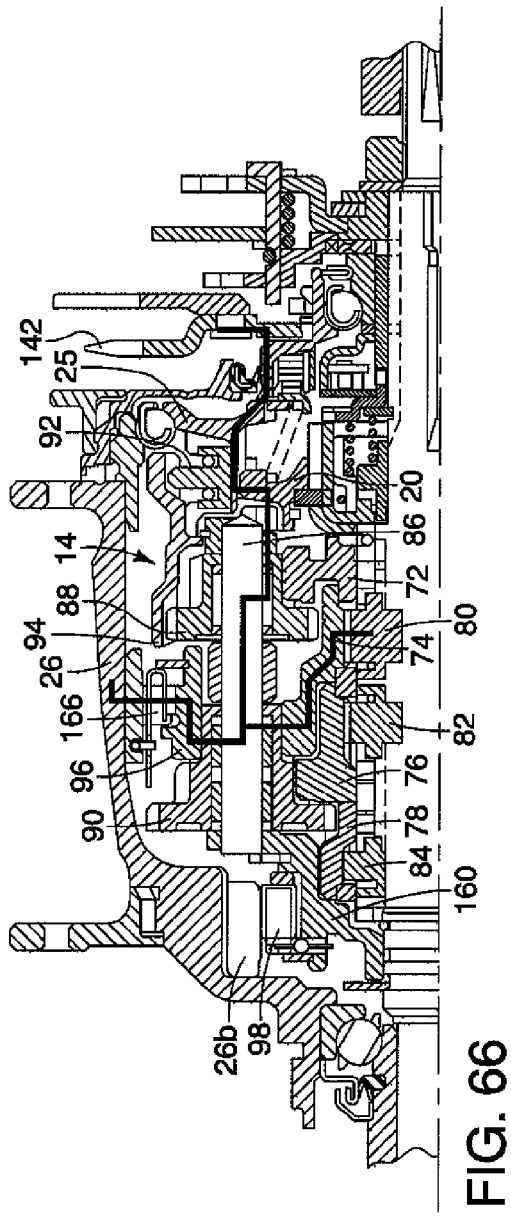
FIG. 66 is a cross-sectional view of a portion of the hub assembly similar to FIGS. 2 and 59-65 showing an eighth power transmission path superimposed over those element of the power transmission assembly that define the eighth power transmission in accordance with the first embodiment of the present invention.

Since the shift key member 70 is confined within the clutch ring 20, the clutch ring 20 moves in an axial direction with the shift key member 70. For example, with the cam followers 144 of the shift key member 70 contacting the cam surface 154 (FIG. 55), the clutch ring 20 is in the position depicted in FIGS. 53 and 57. As the shift key member 70 rotates with rotation of the shifting key guide 170, the cam followers 144 of shift key member 70 slide along the cam surfaces 156 until the cam followers 144 of the shift key member 70 contact the cam surface 158 (FIG. 56). Hence, the clutch ring 20 is moved to the position depicted in FIGS. 54 and 58. As indicated in FIGS. 53 and 54, a biasing spring 225 urges the clutch ring 20 toward the position depicted in FIGS. 53 and 57.

With reference to FIGS. 4, 53 and 54, a description of the biasing spring 172 is now provided. The biasing spring 172 is basically a coil spring that has a diameter greater than the diameter of the positioner 22, but is small enough to at least partially extend into the shifting key guide 170. The biasing spring 172 has a first end 226 and a second end 228 (see FIG. 4). The first end 226 is shaped to hook into the gap defined between adjacent ones of the accurate wall portion 214 and 216 of the shifting key guide 170, as indicated in FIGS. 53 and 54. The second end 228 is dimensioned to hook into a recess 178a formed in an outer periphery of the spring washer 178. During operation of the shift mechanism 16, the biasing spring 172 serves to bias the shifting key guide 170 and the pawl control member 18 in the direction of lower speed power transmission paths, described below.

With specific reference to FIGS. 15-20, a description of the positioner 22 (a positioner) is now provided. The positioner 22 is a cylindrically shaped member that is non-movable in the rotational direction relative to the hub axle 24, as described below. The positioner 22 is configured to urge the pawl control member 18 (a shift controller) to remain at any selected one of the orientations or locations of the pawl control member 18 relative to the hub axle 24. More specifically, as the pawl control member 18 (the shift controller) is moved to various positions around the hub axle 24 (corresponding to speeds 1-8), the positioner 22 urges the pawl control member 18 to align or locate to precise predetermined orientations or circumferential locations. These circumferential locations correspond to each of the power transmission paths (speeds 1-8) of the power transmission assembly 14.

The positioner 22 basically an annular ring shape that includes an outer annular portion 230 and an inner cylindrical portion 232. The outer annular portion 230 includes a plurality of gear teeth 234 that extend in an axial direction on an axial face of the outer annular portion 230. As indicated in FIG. 51, the outer annular portion 230 (which includes the gear teeth 234) is aligned for contact with the gear tooth 110 (the projection) of the base sleeve 100 of the pawl control member 18 (a shift control sleeve). As is also indicated in FIG. 51, the outer annular portion 230 (which includes the gear teeth 234) is aligned for contact with the three gear tooth shaped projections 223 of the shifting key guide 170.

As indicated in FIGS. 15-20, the gear teeth 234 of the positioner 22 have inclined flat surfaces complimentary to the shape of the gear tooth 110 of the pawl control member 18 and the three gear tooth projections 223 of the shift key guide 170. The interaction between the gear tooth 110 (the projection) of the base sleeve 100 of the pawl control member 18, the three gear tooth shaped projections 223 of the shifting key guide 170 and the gear teeth 234 of the positioner 22 provides precise positioning of the pawl control member 18 relative to the second, third and fourth sun gear pawls 80, 82 and 84.

Figure 52:
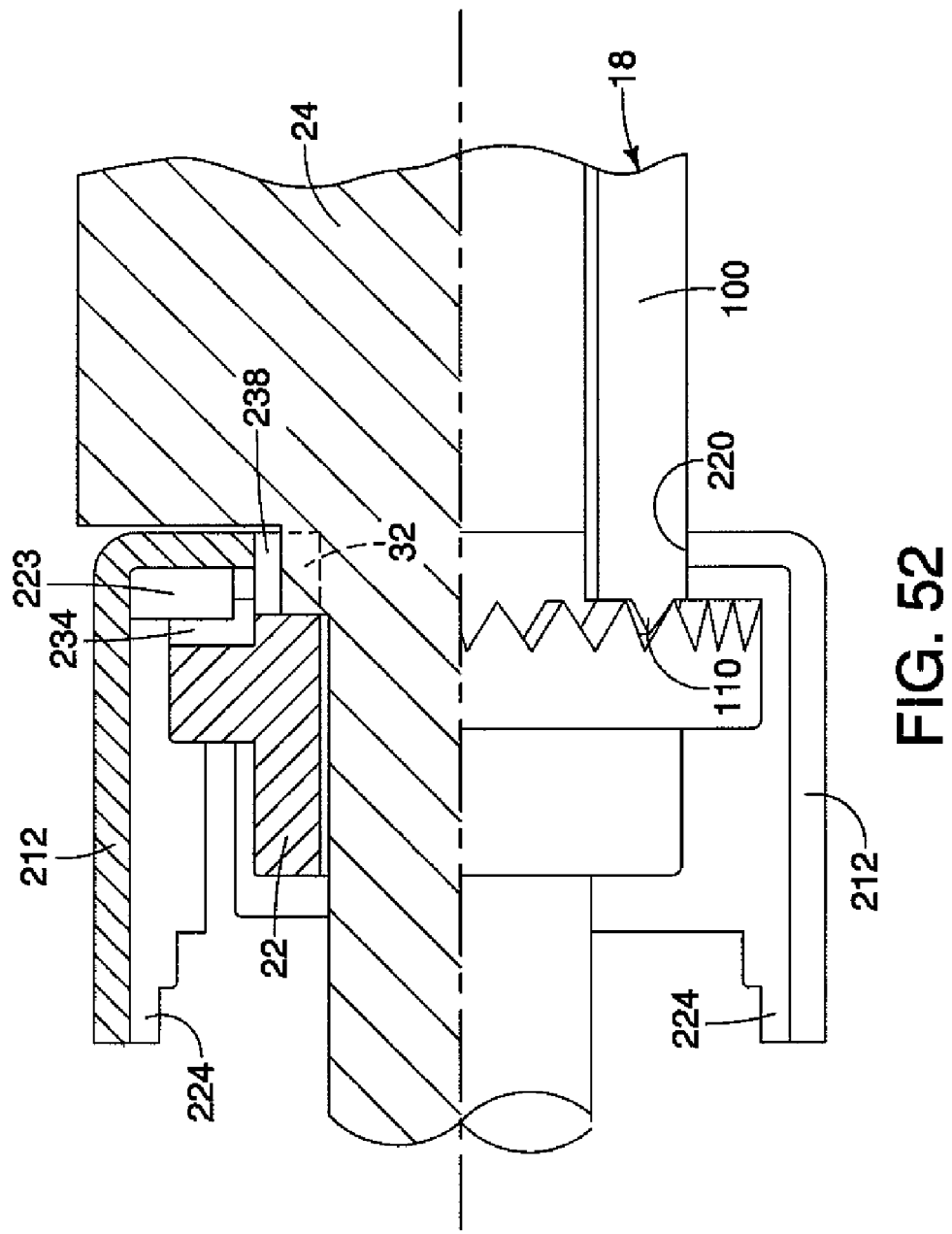
FIG. 52 is a part plan part cross-sectional side view of the hub axle, the pawl control member, the shifting key guide and the positioner in accordance with the first embodiment of the present invention.

As indicated in FIG. 52, the outer annular portion 230 has an outer diameter that is less than the inner diameter of the shifting key guide 170 such that the positioner 22 is disposed within the shifting key guide 170. The inner cylindrical portion 232 has an inner diameter that is approximately equal to or slightly larger than the shift control support portion 27 of the hub axle 24. The inner cylindrical portion 232 includes two small recesses 236 and a large recess 238. The small recesses 236 are dimensioned to receive the projections 34 and 36 of shift control support portion 27 of the hub axle 24. The large recess 238 is dimensioned to receive the projection 32 of shift control support portion 27 of the hub axle 24. Consequently, with the positioner 22 is precisely installed on the hub axle 24 and cannot rotate relative to the hub axle 24, as indicated in FIGS. 2 and 52. However, the positioner 22 can undergo limited movement in an axial direction relative to the hub axle 24 biased by the spring 174.

As shown in FIGS. 4, 53 and 54, the shifting key guide 170 disposed is between the transmission support portion 28 of the hub axle 24 and the positioner 22. The clip 176 is installed within the annular recess 38 of the shift control support portion 27 of the hub axle 24. The spring 174 is confined between the clip 176 and the positioner 22. Therefore, the spring 174 biases the gear teeth 234 of the positioner 22 in an axial direction to contact the gear tooth 110 of the base sleeve 100 of the pawl control member 18 and the three gear tooth shaped projections 223 of the shifting key guide 170.

As shown in FIGS. 21 and 22, the spring washer 178 is a disk shaped member that includes the recess 178a. The spring washer 178 includes a cylindrical portion 244, an intermediate portion 246 and outer radially extending portion 248. The cylindrical portion 244 includes a pair of recesses 250 (also shown in FIG. 4). The intermediate portion 246 defines an annular space. With the hub assembly 12 fully assembled, the clip 176 is disposed within the annular space defined by the intermediate portion 246, as indicated in FIGS. 53 and 54. The outer radially extending portion 248 includes a pair of arcuate protrusions 252 and the recess 178a.

The outer radially extending portion 248 of the spring washer 178 (absent the arcuate protrusions 252) has an outer diameter that is the same or slightly less that distance between inner surfaces of the contact portions 224 of the arcuate wall portions 212 of the shifting key guide 170. An outer diameter defined by the arcuate protrusions 252 of the outer radially extending portion 148 is the same or slightly larger than the overall outer diameter of the shifting key guide 170. With the hub assembly 12 assembled, the arcuate protrusions 252 can contact the contact portions 224 of the shifting key guide 170. Hence, the shifting key guide 170 can undergo limited relative rotation with respect to the spring washer 178.

The spring washer 178 is freely rotatable about the shift control support portion 27 of the hub axle 24, but can be constrained from rotating by interactions with other elements of the shift mechanism 16, as described below. Specifically, the second end 228 of the spring 172 hooks into the recess 178a and the arcuate protrusions 252 can contact the contact portions 224 of the shifting key guide 170. Further, the shift sleeve 186 and the pawl control washer 188 operably interact with the spring washer 178, as described below.

With specific reference to FIGS. 4 and 23, a description of the pawl support 180, the pawls 182 and the pawl shafts 184 is now provided. As shown in FIG. 23, the pawl support 180 is a disk shaped member that includes a central opening 260, pawl shaft support apertures 262, a pair of inner recesses 264 and a pair of outer edge recesses 266. The central opening 260 is dimensioned for installation to the cylindrical portion 244 of the spring washer 178. Specifically, the outer diameter of cylindrical portion 244 of the spring washer 178 is just slightly less than the inner diameter of the central opening 260 such that the pawl support 180 can undergo limited relative rotation about the cylindrical portion 244 of the spring washer 178.

The pawl shaft support apertures 262 are dimension to receive the pawl shafts 184, as indicated in FIGS. 53 and 54. The inner recesses 264 are dimensioned to receive a portion of the shift sleeve 186, as described further below. The outer edge recesses 266 of the pawl support 180 are dimensioned to receive the contact portions 224 of the arcuate wall portions 212 of the shifting key guide 170. More specifically, diameter and arcuate width of the contact portions 224 of the arcuate wall portions 212 of the shifting key guide 170 are dimensioned to fit snuggly within the outer edge recesses 266 of the pawl support 180. Therefore, the shifting key guide 170 and the pawl support 180 rotate together as a single unit in both circumferential directions.

Figure 25:
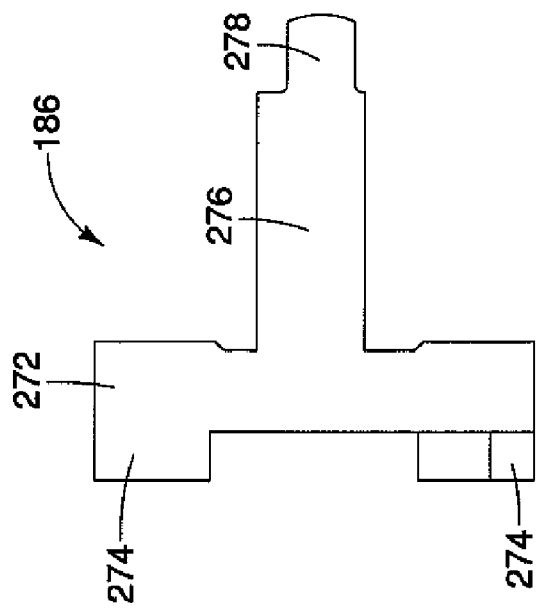
FIG. 25 is a top plan view of the shift sleeve shown removed from the hub assembly in accordance with the first embodiment of the present invention.
Figure 24:
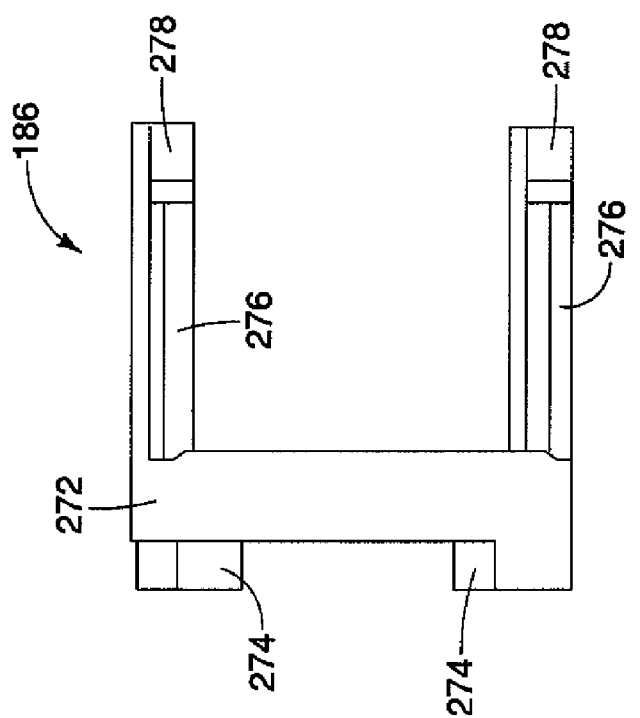
FIG. 24 is a side elevational view of the shift sleeve shown removed from the hub assembly in accordance with the first embodiment of the present invention.

A description of the shift sleeve 186 is now provided with reference to FIGS. 4, 24 and 25. The shift sleeve 186 is basically a cylindrically shaped member with mated pairs of protrusions extending either axial end. As best shown in FIGS. 24 and 25, the shift sleeve 186 includes a cylindric portion 272, first protrusions 274 and second protrusions 276. The first protrusions 274 are dimensioned with a diameter and arcuate width corresponding to the recesses 250 of the spring washer 178. Further, the first protrusions 274 are dimensioned to snuggly fit into the recesses 250 of the spring washer 178. Consequently, the spring washer 178 and the shift sleeve 186 rotate together as a single unit. The second protrusions 276 have the same diameter as the first protrusions 274. However, the second protrusions 276 have a narrower arcuate width than the first protrusions 274. The second protrusions 276 are significantly longer in the axial direction than the first protrusions 274. Distal ends of the second protrusions 276 include contact portions 278.

A description of the pawl control washer 188 is now provided with specific reference to FIGS. 4, 26 and 27. The pawl control washer 188 is a disk shaped member that includes a central opening 280, a pair of recesses 282 extending from the central opening 280 and a pair of projections 284 extending in an axial direction from an outer periphery of the pawl control washer 188. The central opening 280 is dimensioned to rotatably fit about the shift control support portion 27 of the hub axle 24. The recesses 282 are dimensioned with an arcuate width and diameter that corresponds to the second protrusions 276 of the shift sleeve 186. Specifically, the second protrusions 276 of the shift sleeve 186 extend through the recesses 282 of the pawl control washer 188. Consequently, the pawl control washer 188, the shift sleeve 186 and the spring washer 178 all rotate together as a single unit.

Figure 69:
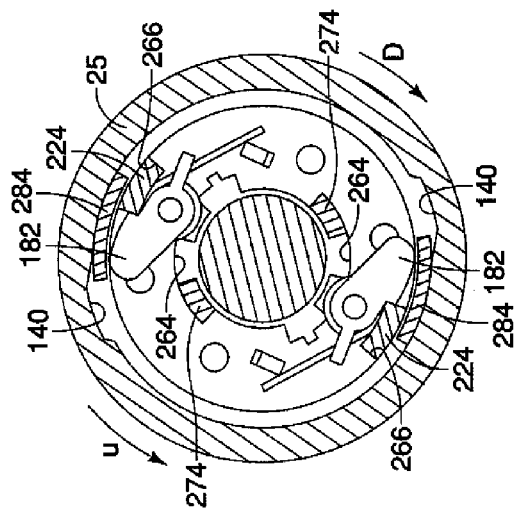
FIG. 69 is yet another cross-sectional view of the portion of the hub assembly depicted in FIGS. 67 and 68 showing the shift assist mechanism in the retracted orientation after use of rotational power of the driver to assist in the shifting of one power transmission path to another power transmission path in accordance with the first embodiment of the present invention.
Figure 68:
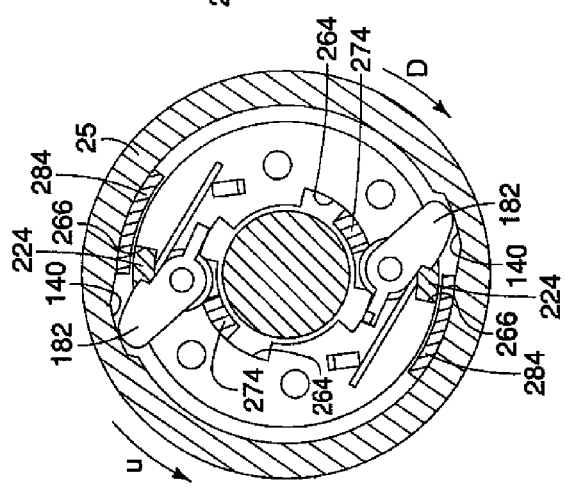
FIG. 68 is another cross-sectional view of the portion of the hub assembly depicted in FIG. 67 showing the shift assist mechanism in an engaged orientation such that rotational power of the driver assists in the shifting of one power transmission path to another power transmission path in accordance with the first embodiment of the present invention.
Figure 67:
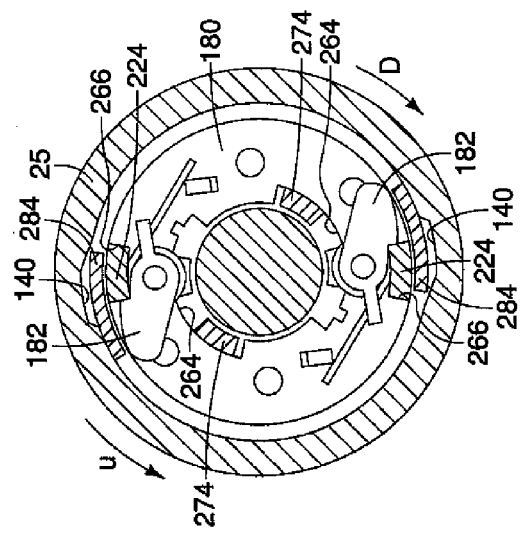
FIG. 67 is a cross-sectional view of a portion of the hub assembly showing a shift assist mechanism which includes a portion of the driver, the pawl support, a pair of pawls and the pawl control washer with the shift assist mechanism in a retracted orientation in accordance with the first embodiment of the present invention.
Figure 70:
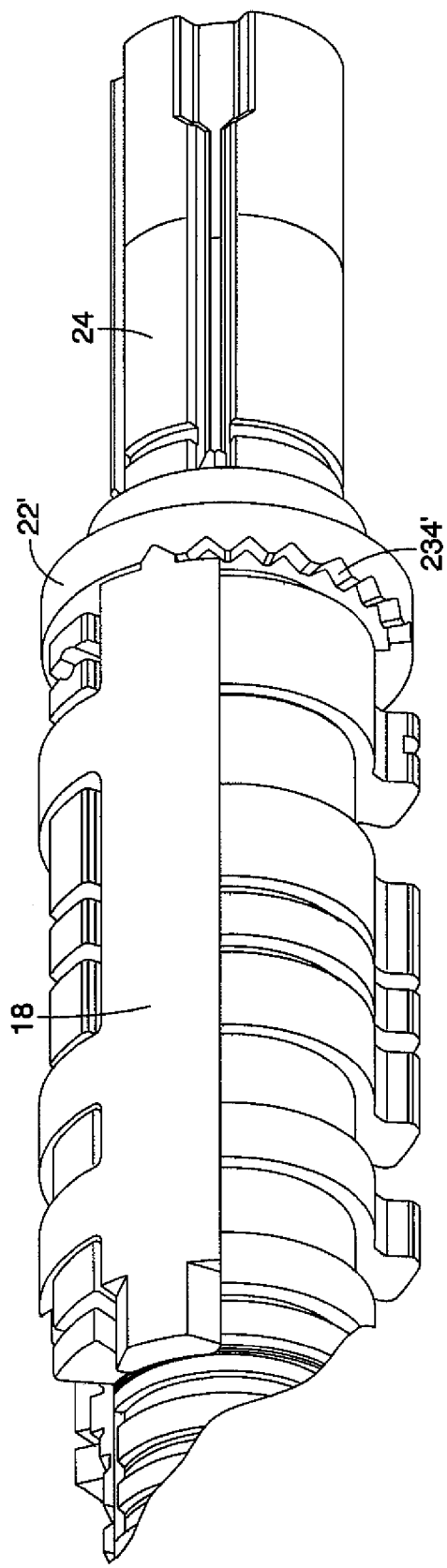
FIG. 70 is a perspective view of a portion of a hub assembly similar to the view in FIG. 5 showing the hub axle, the pawl control member and a positioner with all other elements removed for clarity in accordance with a second embodiment of the present invention.
Figure 74:
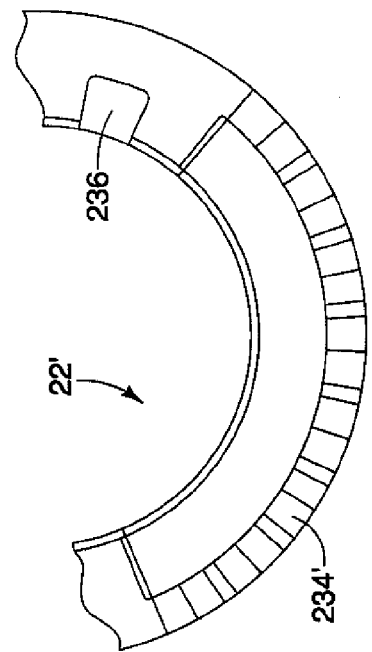
FIG. 74 is an end plan view of the positioner similar to FIG. 71, partially cutaway, showing eight gear teeth of the positioner corresponding to eight power transmission paths in accordance with the second embodiment of the present invention.
Figure 72:
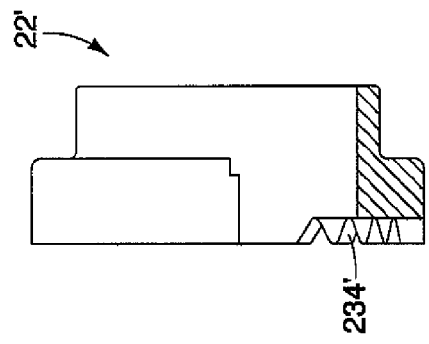
FIG. 72 is a part cross-sectional side view of the positioner similar to the view of the positioner of the first embodiment in FIG. 19, showing the positioner removed from the hub assembly in accordance with the second embodiment of the present invention.
Figure 71:
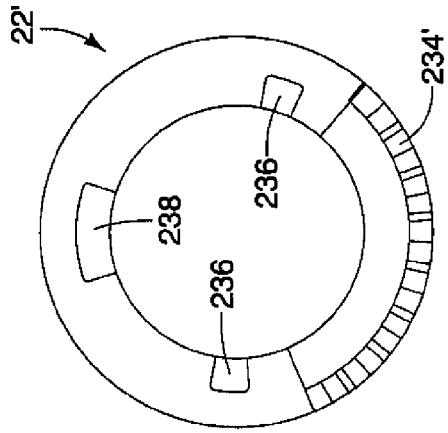
FIG. 71 is an end plan view of the positioner similar to the view of the positioner of the first embodiment in FIG. 18, showing the positioner removed from the hub assembly in accordance with the second embodiment of the present invention.
Figure 73:
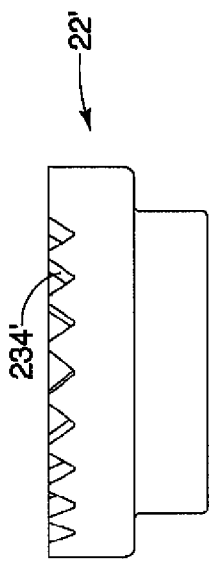
FIG. 73 is a side plan view of the positioner similar to the view of the positioner of the first embodiment in FIG. 20, showing the positioner removed from the hub assembly in accordance with the second embodiment of the present invention.
Figure 77:
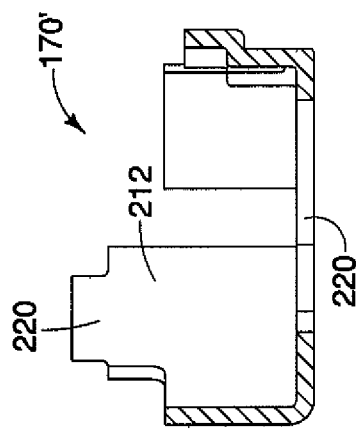
FIG. 77 is a second cross-sectional view of the shifting key guide taken along the lines 77-77 in FIG. 75 in accordance with the second embodiment of the present invention.
Figure 76:
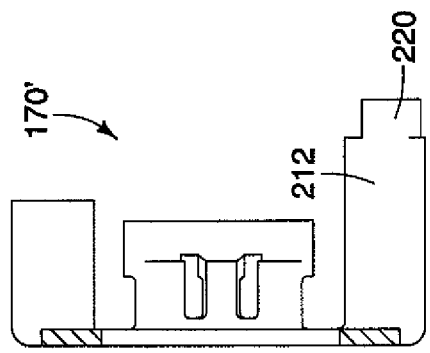
FIG. 76 is a first cross-sectional view of the shifting key guide taken along the lines 76-76 in FIG. 75 in accordance with the second embodiment of the present invention.
Figure 75:
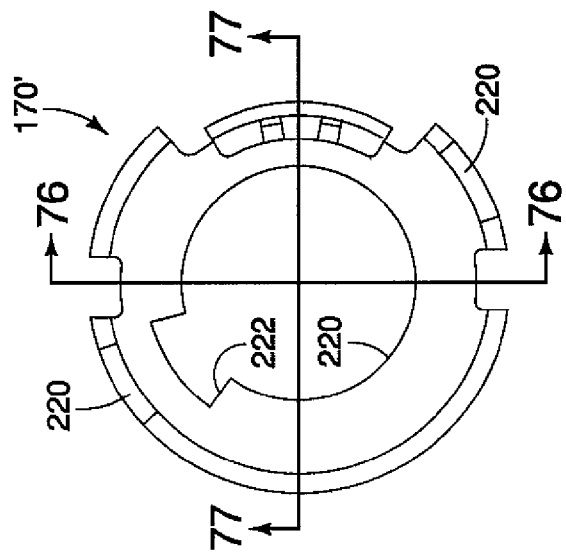
FIG. 75 is an end plan view of a shifting key guide shown removed from the hub assembly in accordance with the second embodiment of the present invention.

The projections 284 are dimensioned to contact and control operation of the pawls 182, as indicated in FIGS. 67-69. More specifically, the pawl support 180, the pawls 182, the pawl control washer 188 and the shift assist gear teeth 140 of the driver 25 all work together as a shift assist mechanism. A description of the operation of the shift assist mechanism is provided below with reference to FIGS. 67-69 after a description of further elements of the hub assembly 12.

A description of the holding plate 190 is now provided with specific reference to FIGS. 28 and 29. The holding plate 190 is an annular ring-shaped member that includes a pair of identical projections 290. Each of the projections 290 includes a first portion 292 and a second portion 294. The projections 290 extend inward from the holding plate 190. The distance between the first portions 292 is such that the first portions 292 extend into the axially extending grooves 30 of the hub axle 24 with the hub assembly 12 fully assembled. Hence, the holding plate 190 cannot rotate relative to the hub axle 24. However, the outer annular portion of the holding plate 190 is spaced apart from the hub axle 24 by a distance equal to the thickness of the second portions 294. Thus gaps are created between an outer surface of the shift control support portion 27 of the hub axle 24, an inner surface of the outer annular portion of the holding plate 190 and the second portions 294 of the projections 290.

The second portions 294 of the projections 290 are located at a diameter equal to the diameter of the second protrusions 276 of the shift sleeve 186. More specifically, with the hub assembly 12 fully assembled, the second protrusions 276 of the shift sleeve 186 extend through the gaps defined between the second portions 294 of the projections 290 of the holding plate 190, as indicated in FIGS. 53 and 54. During operation of the shift mechanism 16, the shift sleeve 186 is able to rotate slightly less than 180 degrees about the hub axle 24 due to contact with the surfaces of the second portions 294 of the projections 290. More specifically, rotation of the shift sleeve 186 is limited by the second portions 294 of the projections 290.

A description of bearing cone 191 is provided now with specific reference to FIG. 4. The bearing cone 191 has an outer surface that supports the bearings $B_1$ and a pair of inwardly extending protrusions 298, similar to the first portion 292 of the protrusions 290 of the holding plate 190. Specifically, the protrusions 298 are dimensioned to extend into the axially extending grooves 30 of the hub axle 24 with the hub assembly 12 fully assembled. Hence, the bearing cone 191 cannot rotate relative to the hub axle 24. However, an inner surface of the remainder of the outer annular portion of the bearing cone 191 is spaced apart from the hub axle 24 by a distance equal to the thickness of the second protrusions 276 of the shift sleeve 186. Hence, the second protrusions 276 of the shift sleeve 186 extend through the interior of the bearing cone 191 as indicated in FIGS. 53 and 54. Further, the bearing cone 191 does not interfere with rotation of the shift sleeve 186.

A description of the actuator plate 192 is now provided with specific reference to FIGS. 30 and 31. The actuator plate 192 is a ring shaped member that includes outer protrusions 300 and inner protrusions 302. There six outer protrusions 300 and four inner protrusions 302. As described below, the outer protrusions are dimensioned to mesh or engage portions of the coupling plate 196. The inner protrusions 302 are paired together such that each pair of inner protrusions 302 defines a gap 304 there between. The gaps 304 are dimensioned to receive the contact portions 278 of the second protrusions 276 of the shift sleeve 186, as indicated in FIGS. 53 and 54. More specifically, the second protrusions 276 of the shift sleeve 186 extend through the holding plate 190 and the bearing cone 191 such that the contact portions 278 fit into the gaps 304. Hence, the actuator plate 192 and the shift sleeve 186 rotate together as a single unit. Further, the actuator plate 192, the shift sleeve 186, the pawl control washer 188 and the spring washer 178 all rotate together as a single unit.

A description of the spacer 194 is now provided with specific reference to FIGS. 32 and 33. The spacer 194 is an annular ring shaped element that includes a central opening 310, a pair of inwardly extending projections 312 and reduced outer diameter sections that define a pair of projections 314. The inwardly extending projections 312 are dimensioned to extend into the grooves 30 of the shift control support portion 26 of the hub axle 24. Consequently, the spacer 194 cannot rotate relative to the hub axle 24.

A description is now provided for the coupling plate 196 with specific reference to FIGS. 34 and 35. The coupling plate 196 is disk-like member with a central opening 320, a first recessed portion 322, a second recessed portion 324 and an outer lip 326. The central opening 320 has a diameter that is approximately the same as an outer diameter of the spacer 194. Therefore, the coupling plate 196 can rotate about an outer periphery of the spacer 194, as indicated in FIGS. 53 and 54.

The first recessed portion 322 of the coupling plate 196 includes a plurality of recesses 328. The recesses 328 are dimensioned to mesh like gear teeth with the outer protrusions 300 of the actuator plate 192. More specifically, the coupling plate 196 and the actuator plate 192 rotate together as a single unit. The second recessed portion 324 is generally flat without contours. The outer lip 326 includes three recesses 330 that serve as gear teeth to engage a portion of the rotatable cable bracket 200, as described below.

Figure 44:
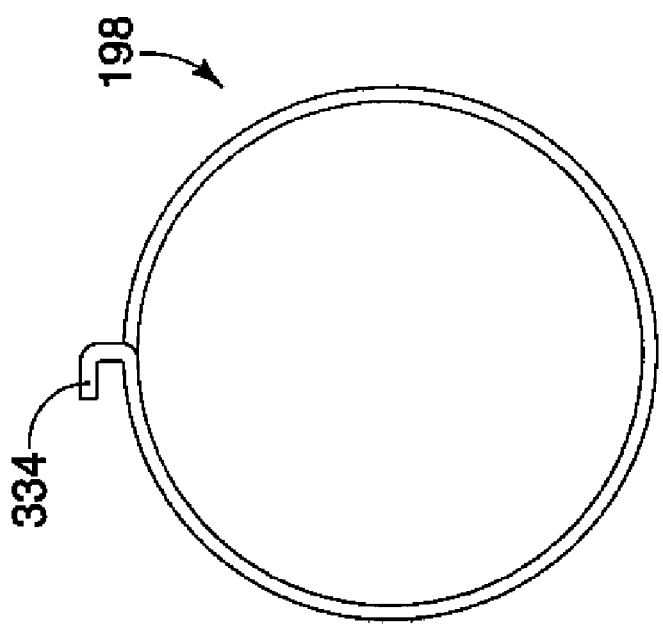
FIG. 44 is a side elevational view of the biasing spring shown removed from the hub assembly in accordance with the first embodiment of the present invention.

As shown in FIGS. 44 and 45, the spring 198 includes a first attachment end 334 and a second attachment end 336 (FIG. 45 only). The spring 198 has a diameter that is slightly smaller than the rotatable cable bracket 200, as indicated in FIGS. 53 and 54. The first attachment end 334 is hooked about a portion of the rotatable cable bracket 200, as indicated in FIGS. 53 and 54. The second attachment end 336 of the spring 198 is hooked about a portion of the fixed cable bracket 202. Therefore, the spring 198 biases the rotatable cable bracket 200 to rotate in one direction relative to the fixed cable bracket 202.

Figure 37:
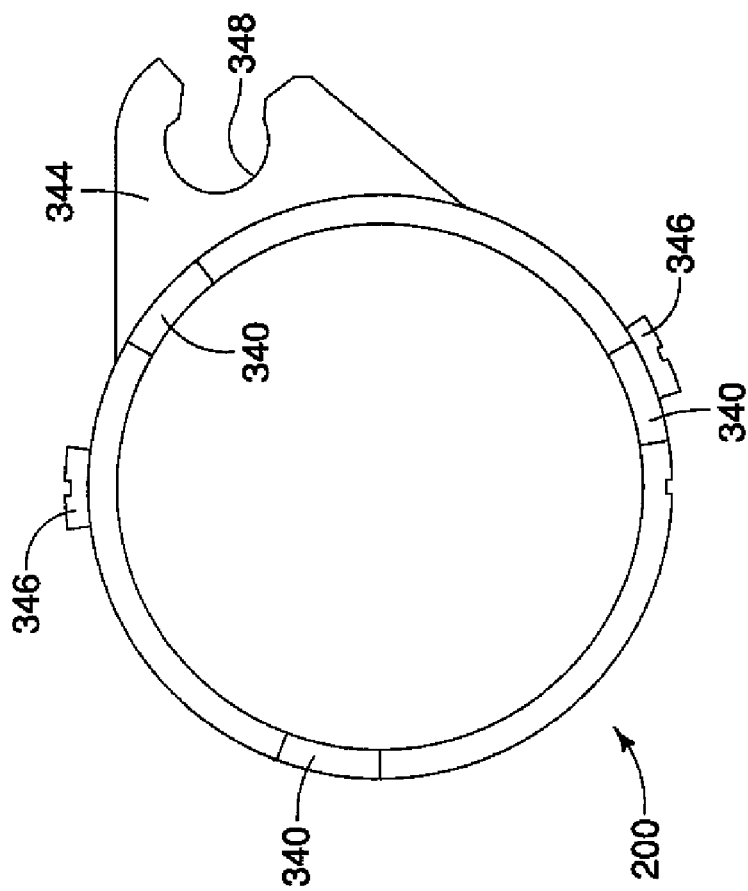
FIG. 37 is an end elevational view of the rotatable cable bracket shown removed from the hub assembly in accordance with the first embodiment of the present invention.
Figure 36:
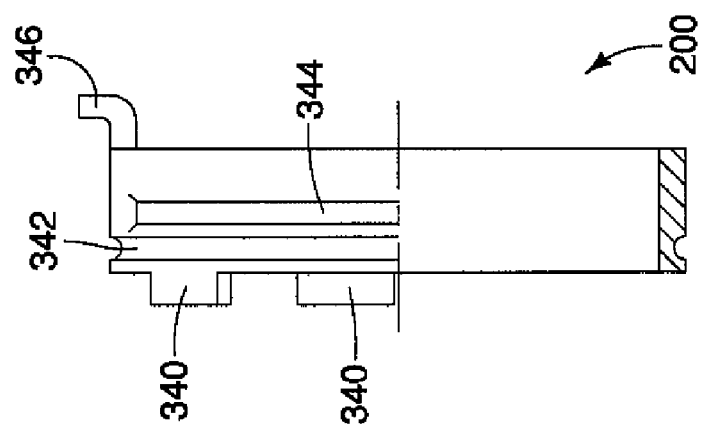
FIG. 36 is a part cross-sectional side view of the rotatable cable bracket shown removed from the hub assembly in accordance with the first embodiment of the present invention.

A description is now provided for the rotatable cable bracket 200 with specific reference to FIGS. 36 and 37. The rotatable cable bracket 200 is basically an annular ring shaped member that includes three axially extending projections 340 at one end, a cable receiving groove 342 on an outer surface, a cable attachment projection 344 and a pair of hook shaped projections 346.

The three axially extending projections 340 are dimensioned to fit snuggly into the three recesses 330 formed in the outer lip 326 of the coupling plate 196. Hence, the coupling plate 196 and the rotatable cable bracket 200 rotate together as a unit. The cable attachment projection 344 extends radially out from the rotatable cable bracket 200 and includes a cable attachment opening 348. The pair of hook shaped projections 346 extend first axially away from the rotatable cable bracket 200 and then bend radially outward defining a hook-like shape.

Figure 39:
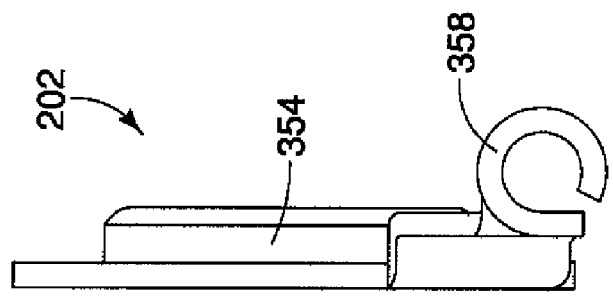
FIG. 39 is front view of the fixed cable bracket shown removed from the hub assembly in accordance with the first embodiment of the present invention.
Figure 38:
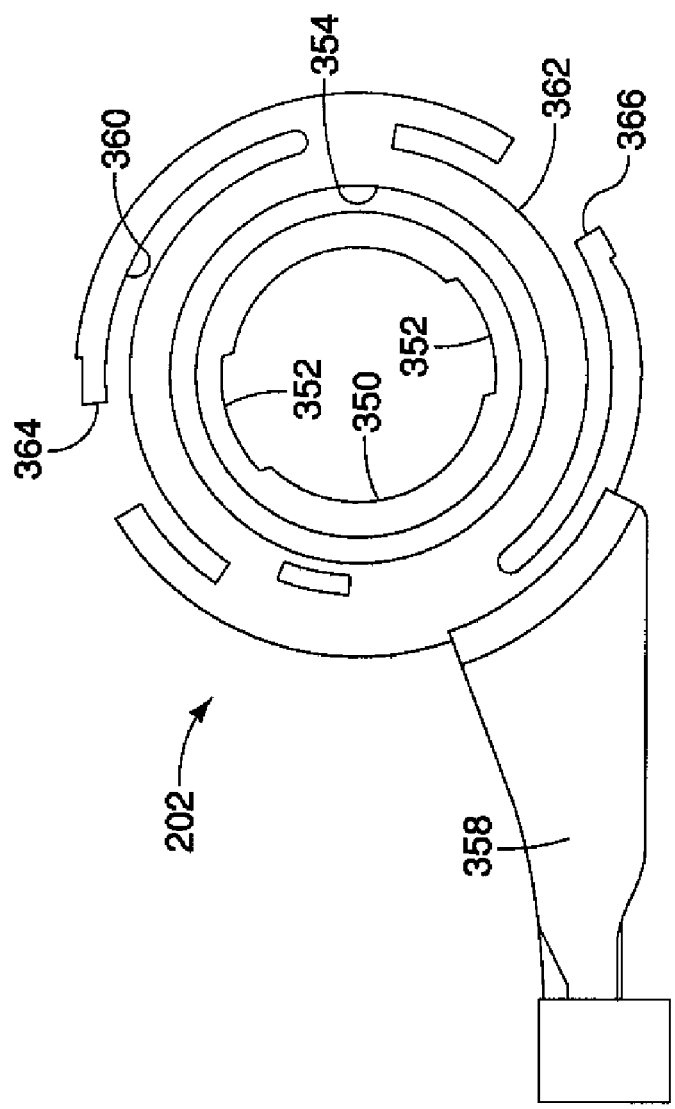
FIG. 38 is a side elevational view of the fixed cable bracket shown removed from the hub assembly in accordance with the first embodiment of the present invention.

A description of the fixed cable bracket 202 is now provided with specific reference to FIGS. 38 and 39. The fixed cable bracket 202 is a complex shaped member that include central aperture 350 with two opposing recesses 352, an annular recessed portion 354, an outer annular projection 356 and a cable attachment projection 358. The two opposing recesses 352 are dimensioned to engage and mesh with the projections 314 of the spacer 194. Since the spacer 194 cannot rotate relative to the hub axle 24, the fixed cable bracket 202 is also non-rotatable relative to the hub axle 24. The annular recessed portion 354 is provided to receive a portion of the spring 198, as indicated in FIGS. 53 and 54. The outer annular projection 356 includes arcuate recesses 360 and 362 which have corresponding radially outward gaps 364 and 366.

The cable attachment projection 358 includes a cable attachment end 370 that is configured to retain the outer sleeve of a conventional Bowden-type cable 380.

With the hub assembly 12 completely assembled, the hook shaped projections 346 of the rotatable cable bracket 200 are inserted (via the gaps 364 and 366) into the arcuate recesses 360 and 362, as indicated in FIGS. 53 and 54. Since the arcuate recesses 360 and 362 have a center that corresponds to the central axis of the stationary shaft 24, the rotatable cable bracket 200 can rotate with respect to the fixed cable bracket 202. More specifically, the surfaces of the arcuate recesses 360 and 362 of the fixed cable bracket 202 serve as bearing surfaces for the hook shaped projections 346 of the rotatable cable bracket 200. In other words, the hook shaped projections 346 of the rotatable cable bracket 200 circumferentially slide within the arcuate recesses 360 and 362 of the fixed cable bracket 202.

Figure 43:
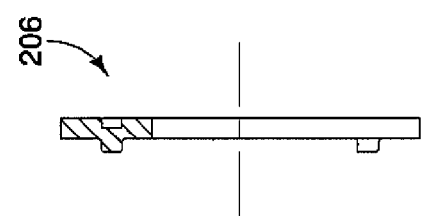
FIG. 43 is part cross-sectional side view of the second spacer shown removed from the hub assembly in accordance with the first embodiment of the present invention.
Figure 42:
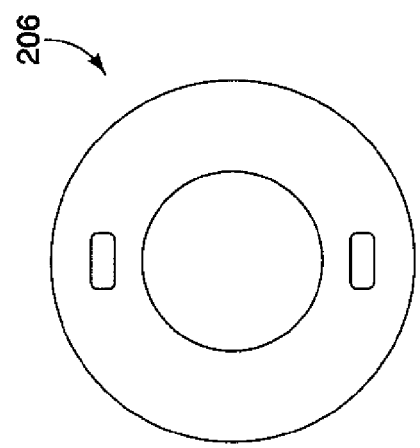
FIG. 42 is a side elevational view of the second spacer shown removed from the hub assembly in accordance with the first embodiment of the present invention.
Figure 41:
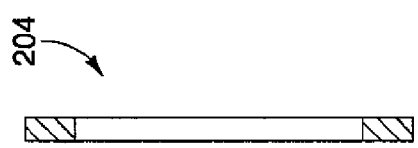
FIG. 41 is part cross-sectional end view of the washer shown removed from the hub assembly in accordance with the first embodiment of the present invention.
Figure 40:
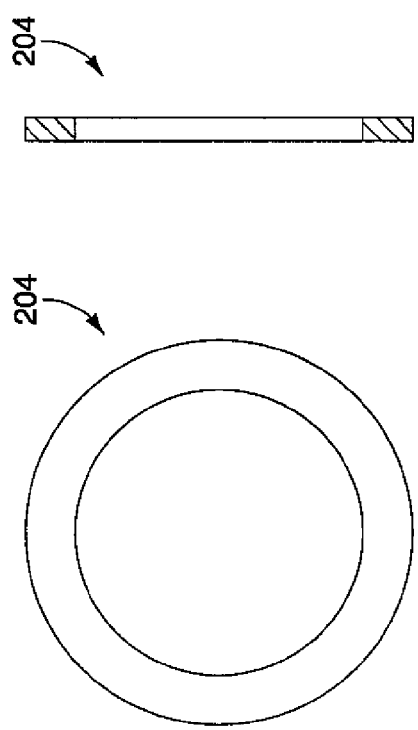
FIG. 40 is a side elevational view of the washer shown removed from the hub assembly in accordance with the first embodiment of the present invention.

The washer 204 (shown in FIGS. 40 and 41) is dimensioned to retain the fixed cable bracket 202 on the spacer 194. The spacer 206 (shown in FIGS. 42 and 43) works in conjunction with the nut 208 threaded to the end of the hub axle 24 to hold the washer 204 against the fixed cable bracket 202, as indicated in FIGS. 53 and 54.

A description of the operation of the shift mechanism 14 and the power transmission assembly 14 is now provided.

A conventional lever actuating shifting mechanism (not shown) is installed on or adjacent to the handlebars (not shown) of the bicycle 10. The conventional Bowden-type cable 380 extends from the conventional lever actuating shifting mechanism to the hub assembly 12, as indicated in FIG. 1. An inner cable 382 of the Bowden-type cable 380 wraps part way around the rotatable cable bracket 200 within the cable receiving groove 342, as indicated in FIGS. 53 and 54. Although not shown, the inner cable 382 of the Bowden-type cable 380 connects to the cable attachment opening 348 of the cable attachment projection 344 of the rotatable cable bracket 200. Consequently, movement of the conventional lever actuating shifting mechanism (not shown) puts tension on of the inner cable 382 of the Bowden-type cable 380. The tension on the inner cable 382 causes the inner cable 382 to move, which in turn causes the rotatable cable bracket 200 to rotate in a first gear shifting direction U (upshifting direction), as indicated in FIGS. 5, 47-51 and 67-69. When tension on the inner cable 382 is released, the cable moves and the rotatable cable bracket 200 rotates in a second gear shifting direction D (downshifting direction), as indicated in FIGS. 5, 47-51 and 67-69, due to the biasing force of the spring 198. The second gear shifting direction D is opposite the first gear shifting direction U.

Movement of the rotatable cable bracket 200 in the first gear shifting direction U causes shift mechanism 16 to change power transmission paths within the power transmission assembly 14 such that a cyclist can increase the speed of the bicycle 10. Movement of the rotatable cable bracket 200 in the second gear shifting direction D causes shift mechanism 16 to change power transmission paths within the power transmission assembly 14 such that a cyclist can increase the speed of the bicycle 10.

In the depicted embodiment, there are eight different power transmission paths or speeds (speeds 1-8). The following description makes specific reference to speeds 1 through 8 which are described in greater detail following a description of the operation of the shift mechanism 14.

The shift mechanism 14 operated by movement of the rotatable cable bracket 200. As described above and indicated in FIGS. 53 and 54, the rotatable cable bracket 200 is engaged with the coupling plate 196 and rotates therewith. The coupling plate 196 is engaged with the actuator plate 192 and rotates therewith. The actuator plate 192 is engaged with the shift sleeve 186 and rotates therewith. Further, the shift sleeve 186 is engaged with both the spring washer 178 and the pawl control washer 188 and rotates therewith. Therefore, the rotatable cable bracket 200, the coupling plate 196, the actuator plate 192, the shift sleeve 186, the pawl control washer 188 and the spring washer 178 all rotate together as a single unit in both the first and second gear shifting directions U and D.

As mentioned above, the first protrusions 274 of the shift sleeve 186 extend through the inner recesses 264 of the pawl support 180. Since the inner recesses 264 have an arcuate length greater that the arcuate length of the first protrusions 274 of the shift sleeve 186, the pawl support 180 only moves with the shift sleeve 186 under certain circumstances, as described below.

With the shift mechanism 16 in the power transmission path designated speed 1, the pawl control member 18 is in the orientation depicted in FIG. 5. Specifically, the pawl control member 18 is rotated such that the base sleeve 100 is located at one circumferential end of the control arm receiving recess 68 of the transmission support portion 28 of the stationary shaft 24. Further, the gear tooth 110 is positioned in a first gear tooth $T_1$ of the gear teeth 234 of the positioning ring 22.

With the pawl control member 18 in the above orientation, the second, third and fourth sun gear pawls 80, 82 and 84 are pulled radially inward by the first, second and third control sleeves 102, 104 and 106 such that the second, third and fourth sun gears 74, 76 and 78 freewheel (rotate freely). Consequently, torque is transmitted in speed 1 along the first power transmission path shown in FIG. 59 and set forth below in Tables 1 and 2 as described below.

The first gear tooth $T_1$ of the gear teeth 234 of the positioning ring 22 provides a means for precisely positioning the pawl control member 18 for selection of speed 1. Since the positioning ring 22 cannot rotate relative to the hub axle 24, the gear teeth 234 are fixed in position in the circumferential direction. Therefore, when gear tooth 110 of the pawl control member 18 is brought into alignment with the first gear tooth $T_1$ of the gear teeth 234 of the positioning ring 22, the biasing force of the spring 174 urges the gear teeth 234 of the positioning ring 22 to retain the pawl control member 18 in position for speed 1.

When the inner cable 382 is tensioned to put the power transmission assembly 14 in speed 2, the rotatable cable bracket 200 is rotated causing rotation of the coupling plate 196, the actuator plate 192, the shift sleeve 186, the pawl control washer 188 and the spring washer 178. In this condition (movement from speed 1 to speed 2), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 2. Although not shown, the pawl control member 18 moves with the shifting key guide 170 such that the gear tooth 110 now rotates into alignment with the gear tooth $T_2$ of the gear teeth 234 (see FIG. 5).

With the pawl control member 18 in the speed 2 orientation, the control portion 84a of the fourth sun gear pawl 84 aligns with the pawl control recess 102a of the first control sleeve 102 of the pawl control member 18. Therefore, the fourth sun gear pawl 84 is free to move radially outward to contact the fourth sun gear 78 and act as a one way clutch. Consequently, torque is transmitted in speed 2 along the second power transmission path shown in FIG. 60 and set forth below in Tables 1 and 2 as described below.

The second gear tooth $T_2$ of the gear teeth 234 of the positioning ring 22 provides a means for precisely positioning the pawl control member 18 for selection of speed 2. Specifically, when the gear tooth 110 of the pawl control member 18 is brought into alignment with the second gear tooth $T_2$ of the gear teeth 234 of the positioning ring 22, the biasing force of the spring 174 urges the gear teeth 234 of the positioning ring 22 to retain the pawl control member 18 in position for speed 2.

When the inner cable 382 is tensioned to put the power transmission assembly 14 in speed 3, the rotatable cable bracket 200 is rotated causing rotation of the spring washer 178. In this condition (movement from speed 2 to speed 3), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 3. Although not shown, the pawl control member 18 moves with the shifting key guide 170 such that the gear tooth 110 now rotates into alignment with the gear tooth $T_3$ of the gear teeth 234 (see FIG. 5).

With the pawl control member 18 in the above orientation, the control portion 82a of the third sun gear pawl 82 aligns with the pawl control recess 104a of the second control sleeve 104 of the pawl control member 18. Therefore, the third sun gear pawl 82 is free to move radially outward to contact the third sun gear 76 and act as a one way clutch. Consequently, torque is transmitted in speed 3 along the third power transmission path shown in FIG. 61 and set forth below in Tables 1 and 2 as described below.

The third gear tooth $T_3$ of the gear teeth 234 of the positioning ring 22 provides a means for precisely positioning the pawl control member 18 for selection of speed 3. Since the positioning ring 22 cannot rotate relative to the hub axle 24, the gear teeth 234 are fixed in position in the circumferential direction. Therefore, when gear tooth 110 of the pawl control member 18 is brought into alignment with the third gear tooth $T_3$ of the gear teeth 234 of the positioning ring 22, the biasing force of the spring 174 urges the gear teeth 234 of the positioning ring 22 to retain the pawl control member 18 in position for speed 3.

When the inner cable 382 is tensioned to put the power transmission assembly 14 in speed 4, the rotatable cable bracket 200 is rotated causing rotation of the spring washer 178. In this condition (movement from speed 3 to speed 4), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 4. Although not shown, the pawl control member 18 moves with the shifting key guide 170 such that the gear tooth 110 now rotates into alignment with the gear tooth $T_4$ of the gear teeth 234 (see FIG. 5).

With the pawl control member 18 in the above orientation, the control portion 80a of the second sun gear pawl 80 aligns with the pawl control recess 106a of the third control sleeve 106 of the pawl control member 18. Therefore, the second sun gear pawl 80 is free to move radially outward to contact the second sun gear 74 and act as a one way clutch. Consequently, torque is transmitted in speed 4 along the fourth power transmission path shown in FIG. 62 and set forth below in Tables 1 and 2 as described below.

The fourth gear tooth $T_4$ of the gear teeth 234 of the positioning ring 22 provides a means for precisely positioning the pawl control member 18 for selection of speed 4. Since the positioning ring 22 cannot rotate relative to the hub axle 24, the gear teeth 234 are fixed in position in the circumferential direction. Therefore, when gear tooth 110 of the pawl control member 18 is brought into alignment with the fourth gear tooth $T_4$ of the gear teeth 234 of the positioning ring 22, the biasing force of the spring 174 urges the gear teeth 234 of the positioning ring 22 to retain the pawl control member 18 in position for speed 4.

When the inner cable 382 is tensioned to put the power transmission assembly 14 in speed 5, the rotatable cable bracket 200 is rotated causing rotation of the spring washer 178. In this condition (movement from speed 4 to speed 5), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 5. Although not shown, the pawl control member 18 moves with the shifting key guide 170 such that the gear tooth 110 now rotates into alignment with the gear tooth $T_5$ of the gear teeth 234 (see FIG. 5).

Additionally, movement of the shifting key guide 170 from the location corresponding to speed 4 to the location corresponding to speed 5 causes axial movement of the shift key member 70. With the shifting key guide 170 in locations corresponding to speeds 1, 2, 3 and 4, the cam followers 144 of the shift key member 70 contact the third cam surfaces 158 of the cam portion 152 of the first sun gear 72, as indicated in FIG. 56. Consequently, the clutch ring 20 remains in a disengaged orientation, as indicated in FIG. 54 and FIGS. 59-62. However, during movement of the shifting key guide 170 from the location corresponding to speed 4 to the location corresponding to speed 5, the cam followers 144 slide along the second cam surfaces 156 of the cam portion 152 of the first sun gear 72. Once the shifting key guide 170 is in the location corresponding to speed 5, the cam followers 144 move to the first cam surfaces 154 of the cam portion 152 of the first sun gear 72, as indicated in FIG. 55. Consequently, the clutch ring 20 becomes engaged with the planet gear carrier 86 and rotates therewith. Further, torque is now directly transmitted from the driver 25 to the planet gear carrier 86 via the clutch ring 20.

With the shifting key guide 170 and the pawl control member 18 in the above orientation, the second, third and fourth sun gear pawls 80, 82 and 84 are pulled radially inward by the first, second and third control sleeves 102, 104 and 106 such that the second, third and fourth sun gears 74, 76 and 78 freewheel (rotate freely). Consequently, torque is transmitted in speed 5 along the first power transmission path shown in FIG. 63 and set forth below in Tables 1 and 2 as described below.

When the inner cable 382 is tensioned to put the power transmission assembly 14 in speed 6, the rotatable cable bracket 200 is rotated causing rotation of the spring washer 178. In this condition (movement from speed 5 to speed 6), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 6. Although not shown, the pawl control member 18 moves with the shifting key guide 170 such that the gear tooth 110 now rotates into alignment with the gear tooth $T_6$ of the gear teeth 234 (see FIG. 5).

With the pawl control member 18 in the speed 6 orientation, the control portion 84a of the fourth sun gear pawl 84 aligns with the pawl control recess 102b of the first control sleeve 102 of the pawl control member 18. Therefore, the fourth sun gear pawl 84 is free to move radially outward to contact the fourth sun gear 78 and act as a one way clutch. Consequently, torque is transmitted in speed 6 along the sixth power transmission path shown in FIG. 64 and set forth below in Tables 1 and 2 as described below.

The sixth gear tooth $T_6$ of the gear teeth 234 of the positioning ring 22 provides a means for precisely positioning the pawl control member 18 for selection of speed 6. Specifically, when the gear tooth 110 of the pawl control member 18 is brought into alignment with the second gear tooth $T_6$ of the gear teeth 234 of the positioning ring 22, the biasing force of the spring 174 urges the gear teeth 234 of the positioning ring 22 to retain the pawl control member 18 in position for speed 6.

When the inner cable 382 is tensioned to put the power transmission assembly 14 in speed 7, the rotatable cable bracket 200 is rotated causing rotation of the spring washer 178. In this condition (movement from speed 6 to speed 7), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 7. Although not shown, the pawl control member 18 moves with the shifting key guide 170 such that the gear tooth 110 now rotates into alignment with the gear tooth $T_7$ of the gear teeth 234 (see FIG. 5).

With the pawl control member 18 in the above orientation, the control portion 82a of the third sun gear pawl 82 aligns with the pawl control recess 104b of the second control sleeve 104 of the pawl control member 18. Therefore, the third sun gear pawl 82 is free to move radially outward to contact the third sun gear 76 and act as a one way clutch. Consequently, torque is transmitted in speed 7 along the seventh power transmission path shown in FIG. 65 and set forth below in Tables 1 and 2 as described below.

The seventh gear tooth $T_7$ of the gear teeth 234 of the positioning ring 22 provides a means for precisely positioning the pawl control member 18 for selection of speed 7. Since the positioning ring 22 cannot rotate relative to the hub axle 24, the gear teeth 234 are fixed in position in the circumferential direction. Therefore, when gear tooth 110 of the pawl control member 18 is brought into alignment with the seventh gear tooth $T_7$ of the gear teeth 234 of the positioning ring 22, the biasing force of the spring 174 urges the gear teeth 234 of the positioning ring 22 to retain the pawl control member 18 in position for speed 7.

When the inner cable 382 is tensioned to put the power transmission assembly 14 in speed 8, the rotatable cable bracket 200 is rotated causing rotation of the spring washer 178. In this condition (movement from speed 7 to speed 8), the first protrusions 274 of the shift sleeve 186 contact the recesses 264 of the pawl support 180. Therefore, the pawl support 180 rotates with the shift sleeve 186. Further, since the contact portions 224 of the shifting key guide 170 are meshed with the outer edge recesses 266 of the pawl support 180, the shifting key guide 170 rotates to a location corresponding to speed 4. Although not shown, the pawl control member 18 moves with the shifting key guide 170 such that the gear tooth 110 now rotates into alignment with the gear tooth $T_8$ of the gear teeth 234 (see FIG. 5).

With the pawl control member 18 in the above orientation, the control portion 80a of the second sun gear pawl 80 aligns with the pawl control recess 106b of the third control sleeve 106 of the pawl control member 18. Therefore, the second sun gear pawl 80 is free to move radially outward to contact the second sun gear 74 and act as a one way clutch. Consequently, torque is transmitted in speed 8 along the eighth power transmission path shown in FIG. 66 and set forth below in Tables 1 and 2 as described below.

The eighth gear tooth $T_8$ of the gear teeth 234 of the positioning ring 22 provides a means for precisely positioning the pawl control member 18 for selection of speed 8. Since the positioning ring 22 cannot rotate relative to the hub axle 24, the gear teeth 234 are fixed in position in the circumferential direction. Therefore, when gear tooth 110 of the pawl control member 18 is brought into alignment with the eighth gear tooth $T_8$ of the gear teeth 234 of the positioning ring 22, the biasing force of the spring 174 urges the gear teeth 234 of the positioning ring 22 to retain the pawl control member 18 in position for speed 8.

When a cyclist decides to downshift, the tension on the inner cable 382 is released and the spring 198 biases the rotatable cable bracket 200, the coupling plate 196, the actuator plate 192, the shift sleeve 186, the pawl control washer 188 and the spring washer 178 to move in the second gear shifting direction D. Further, under certain conditions, the biasing spring 172 biases the shifting key guide 170 and the pawl support 180 to follow movement of the shift sleeve 186 in the second gear shifting direction D (the downshifting direction). Specifically, when there is no torque being transmitted from the driver 25 to the hub shell 26, the biasing spring 172 biases the shifting key guide 170 and the pawl support 180 to follow movement of the shift sleeve 186 in the second gear shifting direction D. In a torque free condition, downshifting between speeds 1-8 is basically the reverse of the operations described above for upshifting.

However, when a cyclist is pedaling hard and torque is being transmitted through the power transmission assembly 14, the downshifting process can be different than described above. Specifically, with torque being transmitted, the biasing force of the biasing spring 172 acting on the shifting key guide 170 and the pawl support 180 may not be sufficient to cause the shifting key guide 170 and the pawl support 180 to follow movement of the shift sleeve 186 in the second gear shifting direction D. Under such circumstances, the shift assist mechanism operates. Specifically, the pawl support 180, the pawls 182 and the shift assist gear teeth 140 of the driver 25 of the shift assist mechanism operate to increase the biasing force on the pawl support 180 and the shifting key guide 170 causing completion of the downshifting process.

The shift assist mechanism operates as follows, with specific reference to FIGS. 67-69. As shown in FIG. 67, under conditions where no torque is being transmitted, the biasing force of the spring 172 (not shown in FIGS. 67-69) is sufficient to maintain contact between one end of the inner recesses 264 of the pawl support 180 and the protrusions 274 of the shift sleeve 186. Since the shift sleeve 186 and the pawl control washer 188 rotate as a unit, the projections 284 of the pawl control washer 188 remain adjacent to the pawls 182, restricting the radial outward movement of the pawls 182.

However, when there is sufficient torque being transmitted through the power transmission assembly 14, the spring 172 may not be sufficient to maintain contact between one end of the inner recesses 264 of the pawl support 180 and the protrusions 274 of the shift sleeve 186. Specifically, when the shift sleeve 186 is rotated in the second gear shifting direction D (downshifting), the protrusions 274 of the shift sleeve 186 will rotate, but the pawl support 180 may remain in the previously selected power transmission path, as indicated in FIG. 68. As shown in FIG. 68, the protrusions 274 no longer contact the one end of the inner recesses 264 of the pawl support 180. However, the shift sleeve 186 and the pawl control washer 188 rotate as a unit. As shown in FIG. 68, the projections 284 of the pawl control washer 188 are moved circumferentially away from the pawls 182, allowing the pawls 182 to engage the shift assist gear teeth 140 of the driver 25. Since the driver 25 is rotating, contact between the shift assist gear teeth 140 of the driver 25 with the pawls 182 causes rotation of the pawl support 180 in the second gear shifting direction D (downshifting). Hence, the pawl support 180 is moved to the orientation shown in FIG. 69. In FIG. 69, the inner recesses 264 of the pawl support 180 again contact the protrusions 274 of the shift sleeve 186 and the projections 284 of the pawl control washer 188 contact the pawls 182 pulling the pawls 182 radially inward and away from the driver 25.

Otherwise, the downshifting process is the reverse of the upshifting process.

The power transmission paths (speeds 1-8) are now described with respect to FIGS. 59-66 and Tables 1 and 2 below.

TABLE 1

| Speed | Clutch ring 20 | Sun Gear 74 | Sun Gear 76 | Sun Gear 78 | Gear Ratio |
|---|---|---|---|---|---|
| 1 (Low) | Disengaged | Free | Free | Free | 0.53 |
| 2 | Disengaged | Free | Free | Locked | 0.64 |
| 3 | Disengaged | Free | Locked | Free | 0.74 |
| 4 | Disengaged | Locked | Free | Free | 0.85 |
| 5 | Engaged | Free | Free | Free | 1.0 |
| 6 | Engaged | Free | Free | Locked | 1.22 |
| 7 | Engaged | Free | Locked | Free | 1.42 |
| 8 (High) | Engaged | Locked | Free | Free | 1.62 |

TABLE 2

| Speed | Component Combinations |
|---|---|
| 1 (FIG. 59) | Driver 25 → Pawl 92 → First ring gear 94 → Carrier 86 (first planet gears 88 rotates around first sun gear 72) → Pawl 98 → Hub shell 26 |
| 2 (FIG. 60) | Driver 25 → Pawl 92 → First ring gear 94 → Carrier 86 (first planet gears 88 rotates around first sun gear 72 and second planet gears 90 rotates around fourth Sun Gear 78) → Second ring gear 96 → Roller clutch 166 → Hub shell 26 |
| 3 (FIG. 61) | Driver 25 → Pawl 92 → First ring gear 94 → Carrier 86 (first planet gears 88 rotates around first sun gear 72 and second planet gears 90 rotates around third Sun Gear 76) → Second ring gear 96 → Roller clutch 166 → Hub shell 26 |
| 4 (FIG. 62) | Driver 25 → Pawl 92 → First ring gear 94 → Carrier 86 (first planet gears 88 rotates around first sun gear 72 and second planet gears 90 rotates around second Sun Gear 74) → Second ring gear 96 → Roller clutch 166 → Hub shell 26 |
| 5 (FIG. 63) | Driver 25 → Clutch ring 20 → Carrier 86 → Pawl 98 → Hub shell 26 |
| 6 (FIG. 64) | Driver 25 → Clutch ring 20 → Carrier 86 (second planet gears 90 rotates around fourth Sun Gear 78) → Second ring gear 96 → Roller clutch 166 → Hub shell 26 |
| 7 (FIG. 65) | Driver 25 → Clutch ring 20 → Carrier 86 (second planet gears 90 rotates around third Sun Gear 76) → Second ring gear 96 → Roller clutch 166 → Hub shell 26 |
| 8 (FIG. 66) | Driver 25 → Clutch ring 20 → Carrier 86 (second planet gears 90 rotates around second Sun Gear 74) → Second ring gear 96 → Roller clutch 166 → Hub shell 26 |

A more detailed description of the speeds represented in Table 2 is now provided. In the first speed (speed 1 of the power transmission paths), torque from the chain sprocket 142 to the driver 25 is transmitted to the first ring gear 94 by the pawls 92. The first ring gear 94 causes the first planet gears 68 to rotate about the fixed first sun gear 72, which in turn cause the carrier 86 to rotate. The carrier 86 then causes the hub shell 26 to rotate via the pawl 98.

In the second speed (speed 2 of the power transmission paths), torque from the chain sprocket 142 to the driver 25 is transmitted to the first ring gear 94 by the pawls 92. The first ring gear 94 causes the first planet gears 68 to rotate about the fixed first sun gear 72, which in turn cause the carrier 86 to rotate. However, now the fourth sun gear 78 is locked in position by the fourth sun gear pawl 84 (one way rotation). Therefore, the second planet gears 90 rotate about the fourth sun gear 78. The second ring gear 96 is rotated by the second planet gears 90. The second ring gear 96 now causes the hub shell 26 to rotate via the roller clutch 166.

In the third speed (speed 3), torque from the chain sprocket 142 to the driver 25 is transmitted to the first ring gear 94 by the pawls 92. The first ring gear 94 causes the first planet gears 68 to rotate about the fixed first sun gear 72, which in turn cause the carrier 86 to rotate. The second planet gears 90 now rotate around the third sun gear 76 which is locked in position by the third sun gear pawl 82. Rotation of the second planet gears 90 again causes the second ring gear 96 to rotate. The second ring gear 96 causes the hub shell 26 to rotate via the roller clutch 166.

In the fourth speed (speed 4), torque from the chain sprocket 142 to the driver 25 is transmitted to the first ring gear 94 by the pawls 92. The first ring gear 94 causes the first planet gears 68 to rotate about the fixed first sun gear 72, which in turn cause the carrier 86 to rotate. The second planet gears 90 now rotate around the second sun gear 74 which is locked in position by the second sun gear pawl 60. Rotation of the second planet gears 90 again causes the second ring gear 96 to rotate. The second ring gear 96 causes the hub shell 26 to rotate via the roller clutch 166.

In the fifth speed (speed 5), the clutch ring 20 now directly couples the driver 25 to the carrier 86. The first ring gear 94 rotates at speeds greater than the driver 25 and the pawls 92 ratchets. In the fifth speed, the carrier 86 causes the hub shell 26 to rotate via the pawl 98.

In the sixth speed (speed 6), torque is transmitted from the driver 25 to the carrier 86 via the clutch ring 20. The fourth sun gear 78 is locked in position by the fourth sun gear pawl 84 (one way rotation). Therefore, the second planet gears 90 rotate about the fourth sun gear 78. The second ring gear 96 is rotated by the second planet gears 90. The second ring gear 96 now causes the hub shell 26 to rotate via the roller clutch 166.

In the seventh speed (speed 7), torque is transmitted from the driver 25 to the carrier 86 via the clutch ring 20. The second planet gears 90 now rotate around the third sun gear 76 which is locked in position by the third sun gear pawl 82. Rotation of the second planet gears 90 again causes the second ring gear 96 to rotate. The second ring gear 96 causes the hub shell 26 to rotate via the roller clutch 166.

In the eighth speed (speed 8), torque is transmitted from the driver 25 to the carrier 86 via the clutch ring 20. The second planet gears 90 now rotate around the second sun gear 74 which is locked in position by the second sun gear pawl 60. Rotation of the second planet gears 90 again causes the second ring gear 96 to rotate. The second ring gear 96 causes the hub shell 26 to rotate via the roller clutch 166.

The rotatable cable bracket 200, the coupling plate 196, the actuator plate 192, the shift sleeve 186, the pawl control washer 188, the spring washer 178, the pawl support 180 and the shifting key guide 170 of the shift mechanism 16 basically serve as a shifting actuating portion of the power transmission assembly 14.

Further, as described above, the rotatable cable bracket 200, the coupling plate 196, the actuator plate 192, the shift sleeve 186, the pawl control washer 188 and the spring washer 178 all rotate together as a single unit. Any one or all of the rotatable cable bracket 200, the coupling plate 196, the actuator plate 192, the shift sleeve 186, the pawl control washer 188 and the spring washer 178 serve as a first rotatable member of the shifting actuating portion, the first rotatable member being disposed relative to the hub axle 24 and operably coupled to the shifting key guide 170 and the pawl control member (the shift controller) for rotation therewith in both the clockwise and counterclockwise directions.

The fixed cable bracket 202 serves as a fixed plate non-rotatably fixed to the hub axle 24 having an outer cable connection (the cable attachment projection 358).

Either or both of the pawl support 180 and the shifting key guide 170 serves as a second rotatable member of the shifting actuating portion of the power transmission assembly 14. Specifically, both the pawl support 180 and the shifting key guide 170 are rotatable in the clockwise and counterclockwise directions about the hub axle 24 and operably connect to the first rotatable member with limited relative rotation with respect to the first rotatable member. The second rotatable member (the pawl support 180 and/or the shifting key guide 170) is rotatable in at least one direction by the Bowden-type cable 380 (a shift control cable) and rotatable in the opposite direction by a spring (the spring 172).

Second Embodiment

Referring now to FIGS. 70-77, a positioning ring 22' and a shifting key guide 170' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment all elements of the hub assembly 12 are utilized except that the positioning ring 22 and the shifting key guide 170 are replaced by the positioning ring 22' and the shifting key guide 170'. All elements of the second embodiment operate in a manner identical to the elements of the first embodiment except that the interaction between the positioning ring 22' and the shifting key guide 170' differs slightly from the interaction between the positioning ring 22 and the shifting key guide 170 of the first embodiment.

In the second embodiment the positioning ring 22' is similar to the position ring 22 of the first embodiment except that the positioning ring 22' has only eight gear teeth 234'. However, the positioning ring 22' does include the two small recesses 236 and the large recess 238 that non-rotatably engage the hub axle 24.

The shifting key guide 170' is similar to the shifting key guide 170 of the first embodiment, but the shifting key guide 170' does not include the three gear tooth shaped projection 223 of the shifting key guide 170 of the first embodiment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the ®scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A multi-speed internal bicycle hub transmission assembly comprising:
   a hub axle;
   a driver rotatably supported to the hub axle;
   a hub shell rotatably supported to the hub axle;
   a power transmission mechanism operably disposed between the driver and the hub shell for transmitting rotational power from the driver to the hub shell through a plurality of power transmission paths; and
   a shift control mechanism including a shift controller and a positioner, the shift controller being movable in rotational directions relative to the hub axle to a plurality of orientations, each orientation corresponding to selection of a corresponding one of the plurality of power transmission paths of the power transmission mechanism, and the positioner being non-movable in the rotational direction and configured to urge the shift controller to remain at any selected one of the orientations.

2. The multi-speed internal bicycle hub transmission assembly according to claim 1 wherein
   the shift controller includes a base sleeve that has a projection on axially extending end portion thereof, and at least one pawl control arm; and
   the positioner has an annular ring shape that includes an outer annular portion having a plurality of gear teeth that extend in an axial direction, the gear teeth aligned for contact with the projection of the base sleeve of the shift control sleeve.

3. The multi-speed internal bicycle hub transmission assembly according to claim 2 wherein
   the shift control mechanism includes a spring positioned to bias the gear teeth of the positioner in an axial direction toward to the projection of the base sleeve of the shift controller.

4. The multi-speed internal bicycle hub transmission assembly according to claim 3 wherein
   the projection of the shift controller has inclined flat surfaces having an inverted V-shape, and the gear teeth of the positioner have complimentary inclined flat surfaces such that contact between the projection and gear teeth provides precise positioning of the shift controller.

5. The multi-speed internal bicycle hub transmission assembly according to claim 1 wherein
   the shift controller includes a shifting key guide rotatably disposed about the hub axle having a disk-like portion with a central hub axle receiving aperture, the shifting key guide having at least one gear tooth shaped projection on the disk-like portion; and
   the positioner has an annular ring shape that includes an outer annular portion having a plurality of gear teeth that extend in an axial direction, the gear teeth being aligned for contact with the projection of the shift key guide.

6. The multi-speed internal bicycle hub transmission assembly according to claim 5 wherein
   the shift key guide includes a plurality of gear tooth shaped projections on the disk-like portion aligned to contact the projection of the shift key guide.

7. The multi-speed internal bicycle hub transmission assembly according to claim 5 wherein
   the shift control mechanism includes a spring positioned to bias the gear teeth of the positioner in an axial direction toward to the projection of the shifting key guide.

8. The multi-speed internal bicycle hub transmission assembly according to claim 5 wherein
   the protrusion of the shift key guide has inclined flat surfaces having an inverted V-shape, and the gear teeth of the positioner have complimentary inclined flat surfaces such that contact between the protrusion of the shift key guide and gear teeth provides precise positioning of the shift controller.

9. The multi-speed internal bicycle hub transmission assembly according to claim 1 further comprises:
   a shifting actuating portion operably coupled to the shift controller to selectively rotate the shift controller in clockwise and counter clockwise directions about the hub axle.

10. The multi-speed internal bicycle hub transmission assembly according to claim 9 wherein
    the shifting actuating portion comprises
    a fixed plate non-rotatably fixed to the hub axle having an outer cable connection;
    a first rotatable member rotatably disposed relative to the hub axle and operably coupled to the shift controller for rotation therewith in both the clockwise and counterclockwise directions; and
    a second rotatable member that is rotatable in both the clockwise and counterclockwise directions about the hub axle and operably connect to the first rotatable member with limited relative rotation with respect to the first rotatable member.

11. The multi-speed internal bicycle hub transmission assembly according to claim 10 wherein
    the second rotatable member is rotated in at least one direction by a shift control cable.

12. The multi-speed internal bicycle hub transmission assembly according to claim 10 wherein
    the second rotatable member is rotated in at least one direction by a biasing spring.

13. The multi-speed internal bicycle hub transmission assembly according to claim 10 wherein
    the second rotatable member is rotated in a first direction by a cable and in a second direction by a spring.

* * * * *